(12) United States Patent
Katagi et al.

(10) Patent No.: US 7,697,683 B2
(45) Date of Patent: Apr. 13, 2010

(54) CRYPTOGRAPHY-PROCESSING METHOD, CRYPTOGRAPHY-PROCESSING APPARATUS AND COMPUTER PROGRAM

(75) Inventors: Masanobu Katagi, Kanagawa (JP); Toru Akishita, Tokyo (JP); Izuru Kitamura, Kanagawa (JP); Tsuyoshi Takagi, Darmstadt (DE)

(73) Assignee: Sony Corporation, Tokyo (JP)

( * ) Notice: Subject to any disclaimer, the term of this patent is extended or adjusted under 35 U.S.C. 154(b) by 1172 days.

(21) Appl. No.: 11/065,941

(22) Filed: Feb. 25, 2005

(65) Prior Publication Data
US 2005/0201553 A1 Sep. 15, 2005

(30) Foreign Application Priority Data
Mar. 12, 2004 (JP) .................... P2004-071757

(51) Int. Cl.
*H04L 9/28* (2006.01)
*H04L 9/14* (2006.01)
(52) U.S. Cl. .................................. 380/30; 380/44
(58) Field of Classification Search ............... None
See application file for complete search history.

(56) References Cited

OTHER PUBLICATIONS

Tanja Lange, Efficient Arithmetic on Genus 2 Hyperelliptic Curves over Finite Fields via Explicit Formulae, Information-Security and Cryptography, Ruhr-University of Dochum, Universitatsstr, 150, 44750 Bochum, Germany, Dec. 15, 2003.*

Junichi Kuroki, Masaki Gonda, Kazuto Matsuo, Jinhui Chao and Shigeo Tsujh, Fast Genus Three Hyperelliptic Curve Cryptosystems, Engineering, Cho University, Jan. 13, 1927 Kasuga, Bunkyo-ku, Tokyo, 112-8551 Japan.*
Masanobu Katagi, Izuru Kitamura, Toru Akishita and Tsuyoshi Takagi, Eficient Implementations of Hyperelliptic Curve Cryptosystems Using Degenerate Divisors, LNCS 3325, pp. 345-350, 2004, Springer-Verlag Berlin Heidelberg 2004.*
Cantor, David. G., "Computing in the Jacobian of Hyperelliptic Curve", Math. Comp., vol. 48, No. 177, pp. 95-101, 1987.
Coron, Jean-Sebastien, "Resistance Against Differential Power Analysis for Elliptic Curve Cryptosystems", Cryptographic Hardware and Embedded Systems, vol. 1717 of Lecture Notes in Computer Science, pp. 292-302, Springer-Verlag, 1999.

(Continued)

*Primary Examiner*—Nasser Moazzami
*Assistant Examiner*—Fatoumata Traore
(74) *Attorney, Agent, or Firm*—Sonnenschein Nath & Rosenthal LLP

(57) ABSTRACT

A cryptography-processing method for carrying out computation processing of hyperelliptic curve cryptography at a high speed and a cryptography-processing apparatus for implementing the method. In execution of scalar multiplication processing, a divisor is selected among divisors each having a weight $g_0$ smaller than the genus g of a hyperelliptic curve where $1 \leq g_0 < g$ to serve as a base point. In hyperelliptic curve cryptography carried out in this configuration for a genus g of 2, computation processing of the scalar multiplication can be changed from HarleyADD to execution steps of $\text{ExHarADD}^{2+1 \to 2}$ with a small number of computation-processing steps. For a genus g of 3, on the other hand, computation processing of the scalar multiplication can be changed from HarleyADD to execution steps of $\text{ExHarADD}^{3+ \to 3}$. or $\text{EXHarADD}^{3+1 \to 3}$. with a small number of computation-processing steps. By changing the computation processing as described above, the processing speed can be increased.

21 Claims, 6 Drawing Sheets

OTHER PUBLICATIONS

Koblitz, Neal, "Hyperelliptic Cryptosystems", J. Cryptology, vol. 1, No. 3, pp. 139-150, 1989.

Kocher, Paul et al. "Differential Power Analysis", CRYPTO '99, LNCS, 1666, pp. 388-397, Springer-Verlag, 1999.

Kocher, Paul, "Timing Attacks on Implementations of Diffie-Hellman, RSA, DSS, and Other Systems", in: Koblitz, N., Advances in Cryptography—Crypto '96 (Berlin, Springer, 1996), pp. 104-113.

Lange, Tanja, "Inversion-Free Arithmetic on Genus 2 Hyperelliptic Curves", Cryptology eprint Archive, 2002/147, IACR, 2002.

Lange, Tanja, "Weighted Coordinates on Genus 2 Hyperelliptic Curves", Cryptology eprint Archive, 2002/153, IACR, 2002.

Matsuo Kazuto et al., "Fast Genus Two Hyperelliptic Curve Cryptosystems", Technical Report of IEICE, ISEC2001-31, Japan, 2001.

Mumford, David, "Divisors on Hyperelliptic Curves", Tata Lectures on Theta II, Progress in Mathematics, No. 43, pp. 3.12 to 3.27, Birkhauser, 1984.

Nagao, Koh-ichi, "Improving Group Law Algorithms for Jacobians of Hyperelliptic Curves", ANTS-IV, LNCS 1838, pp. 439-448, Springer-Verlag, 2000.

Sugizaki, Hiroki et al., "An Extension of Harley Addition Algorithm for Hyperelliptic Curves over Finite Fields of Characteristic Two", Technical Report of IEICE, ISEC2002-9, May 2002.

Takahashi, Naoyuki et al., "Efficient exponentiation on Genus Two Hyperelliptic Curves (II)", Technical Report of IEICE, ISEC2002-145, Mar. 2003. (Japanese with English abstract).

* cited by examiner

FIG. 1A ADDITION

FIG. 1B DOUBLING COMPUTATION

F I G. 5
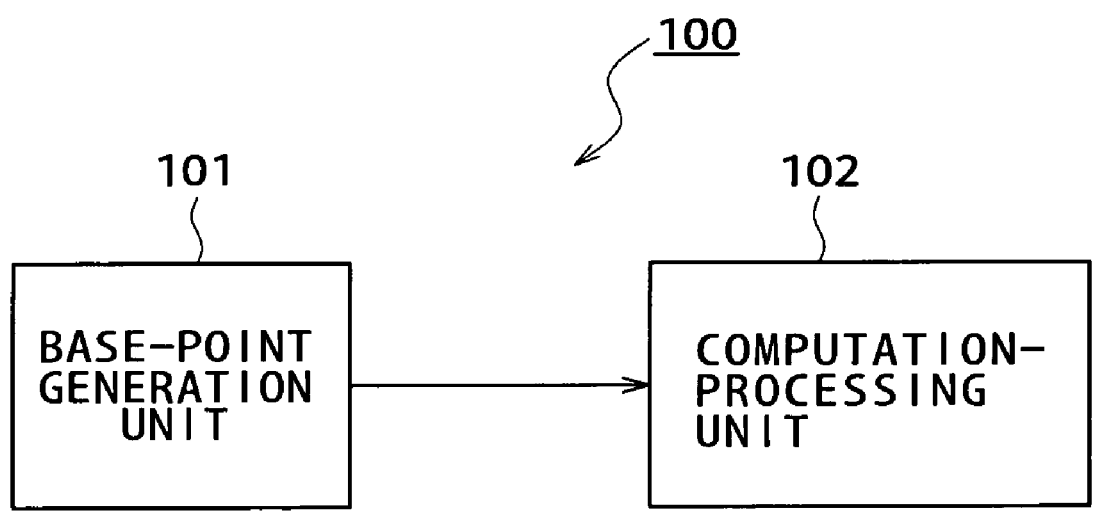

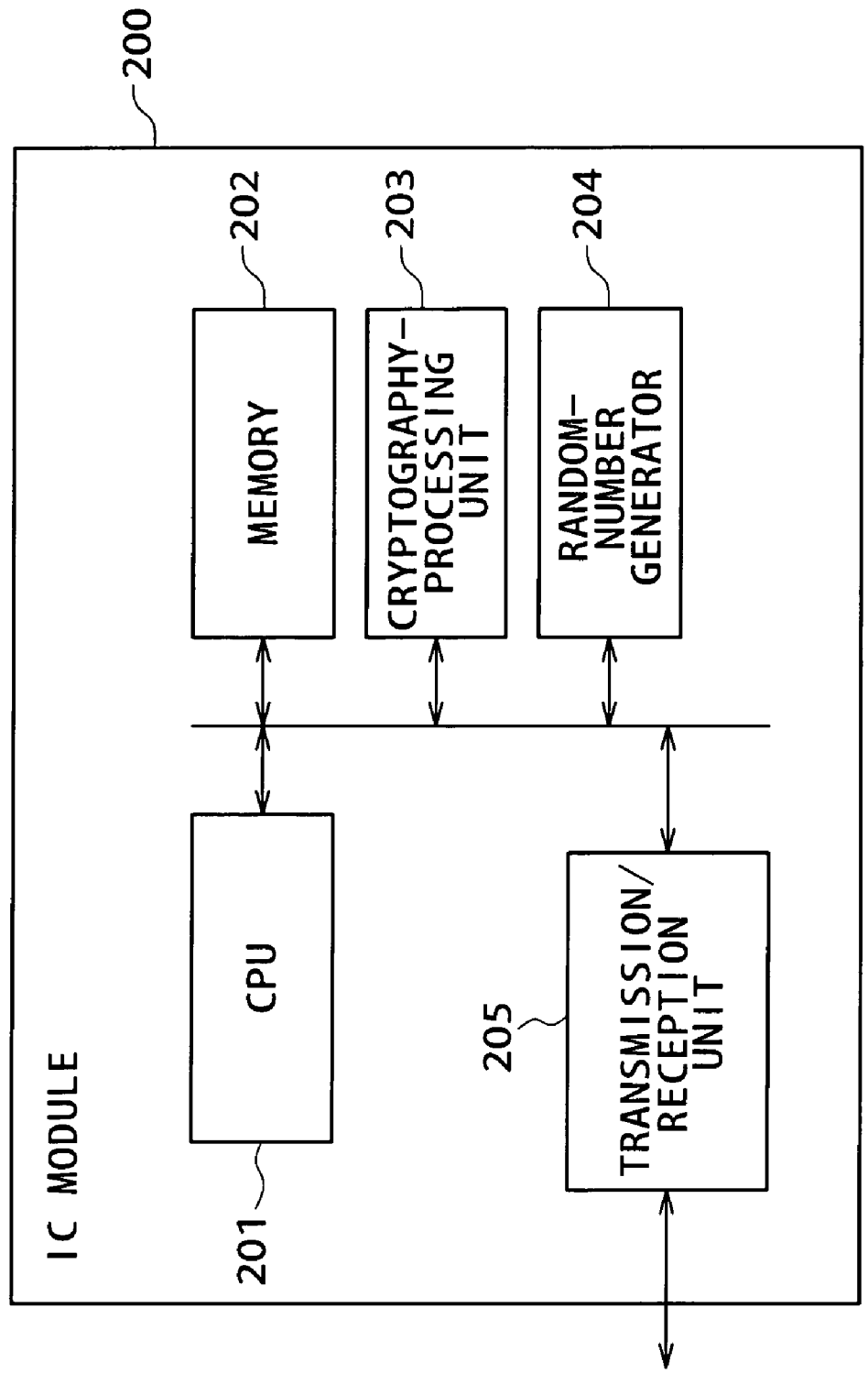

CRYPTOGRAPHY-PROCESSING METHOD, CRYPTOGRAPHY-PROCESSING APPARATUS AND COMPUTER PROGRAM

BACKGROUND OF THE INVENTION

The present invention relates to a cryptography-processing method, a cryptography-processing apparatus and a computer program. More particularly, the present invention relates to a cryptography-processing method for increasing the processing speed of scalar multiplication in hyperelliptic curve cryptography, relates to a cryptography-processing apparatus adopting the cryptography-processing method and relates to a computer program implementing the cryptography-processing method.

With recent development of network communication and electronic business transaction systems, assurance of security in communications has becoming an important problem. One of methods to assure security is a cryptography technology. Recently, communications are carried out by using a variety of cryptography techniques.

For example, there has been developed a system in which data is exchanged between an IC card including an embedded cryptography-processing module and a reader/writer by carrying out an authentication process and processes to encrypt or decrypt the exchanged data. In such a system, the reader/writer serves as an apparatus for reading and writing the data from and into the IC card.

An IC card typically carrying out a cryptography process is utilized widely in a variety of gates such as an entrance gate of a train station or shopping centers, raising a strong demand for downsizing of the IC card and a demand for enhancement of the processing speed involving the IC card.

Cryptography methods are divided into two large categories, i.e., a common-key cryptography method and a public-key cryptography method. The common-key cryptography method is also referred to as a symmetrical cryptography method. In the common-key cryptography method, the sender and the receiver both have a common key. A representative of the common-key cryptography method is a DES (Data Encryption Standard). The DES is characterized in that the encryption and decryption processes can be carried out in accordance with all but the same algorithms provided by the DES.

As opposed to the common cryptography key, in the public-key cryptography method or an asymmetrical cryptography method, the sender may have a key different from the key owned by the receiver. Unlike the common-key cryptography method whereby a common key is used in encryption and decryption processes, the public-key cryptography method is advantageous to management of keys because only one specific person needs to hold a secret key, which must be kept secretly. In comparison with the common-key cryptography method, however, the public-key cryptography method entails a low processing speed. Therefore, in general, the public-key cryptography method is widely adopted only in transmission of a secret key and transmission of an object having a small amount of data such as a digital signature. As representatives of the public-key cryptography method, RSA (Rivest-Shamir-Adleman) cryptography and ECC (Elliptic Curve Cryptography) are known.

The elliptic curve cryptography uses an elliptic curve $y^2=x^3+ax+b$ (where $4a^3+27b^2 \neq 0$) over a prime field and an elliptic curve $y^2+xy=x^3+ax^2+b$ (where $b \neq 0$) over two extension fields. A set including an infinity point O added to a point on each of these curves forms a finite group for the addition, and the infinity point O becomes an identity element. In the following description, addition of points in the finite group is expressed by the operator +, and addition (P+Q) of two different points P and Q in the finite group is referred to as addition of points. In particular, addition (P+P=2P) of two the points P in the finite group is referred to as doubling computation of a point. An operation to add the point P to itself k times, that is, an operation to compute P+P+ - - - +P=kP, is referred to as scalar multiplication of a point.

As commonly known, the scalar multiplication can be composed of additions of a point and doubling computations of the point. The addition of points, the doubling computation of a point and the scalar multiplication of a point in affine coordinates (x, y) or projective coordinates (X, Y, Z) on an elliptic curve over the prime field and an elliptic curve over the two extension fields are described in IEEE P1363/D13 Standard Specifications for Public Key Cryptography.

As a method of generalizing the elliptic curve cryptography, Koblitz and Cantor have proposed an HECC (hyperelliptic curve cryptography) method. The hyperelliptic curve cryptography method is described in Non-Patent Documents 1 and 2.

Let P be a point on an elliptic curve defined over a finite field $F_q$ and Q be equal to kP ($k \in Z$), that is, Q be a result of scalar multiplication of the point P. In this case, a problem of finding k from Q can be solved as a discrete logarithmic problem. On the other hand, let $D_1$ be a divisor equal to a linear sum of points in the hyperelliptic curve cryptography and $D_2$ be a divisor defined as a scalar multiplication $kD_1$. In this case, a problem of finding k from $D_2$ can be treated as a discrete logarithmic problem in a Jacobian variety on the hyperelliptic curve and handling as public-key cryptography is possible.

In the case of hyperelliptic curves, a value characterizing a curve is referred to as a genus g. Let q be equal to $p^n$ ($q=p^n$) where notation p denotes a prime number and notation n denotes a positive integer. In this case, a hyperelliptic curve C defined over the finite field $F_q$ as a curve of the genus g is expressed by the following equation:

$$y^2+h(x)y=f(x)$$

where h(x), f(x)$\in F_q$[x] and f(x) is a monic polynomial of an order of (2g+1).

A point −P opposite to a point P (x, y) on the hyperelliptic curve C is defined as (x, y+h(x)). A point for which P=−P is referred to as a ramification point.

As is commonly known, given safety equivalent to that of the elliptic curve cryptography, the processing size (or the number of bits) of a definition body of the hyperelliptic curve cryptography can be reduced to 1/g times the processing size of a definition body of an elliptic curve cryptography. A small processing size provides an implementation merit, which is one of advantages of the hyperelliptic curve cryptography.

Next, fundamentals of the hyperelliptic curve cryptography are explained. As described above, a problem of finding k from $D_2$ can be treated as a discrete logarithmic problem in a Jacobian variety on the hyperelliptic curve and it is possible to treat the problem as a problem in a public-key cryptography where $D_2$ is a divisor defined as a scalar multiplication $kD_1$, k is a multiplier in the scalar multiplication $kD_1$ and D, is a divisor equal to a linear sum of points in the hyperelliptic curve cryptography.

In this case, a divisor is expressed by the following equation:

$$D = \sum_i m_i P_i - \left(\sum_i m_i\right) P_\infty, \quad m_i \geq 0 \quad \text{Equation 1}$$

However, for $P_i=(x_i, y_i)$ and $i \neq j$, a relation $P_i \neq P_j$ holds true. The divisor expressed in this format is referred to as a semi reduced divisor.

$\Sigma m_i$ in the above equation is referred to as the weight of the divisor D. A semi reduced divisor having a weight not exceeding the genus g is referred to as a reduced divisor.

In terms of polynomials U and V where U, V∈$F_q$[x], any semi reduced devisor D in a Jacobian variety on the hyperelliptic curve can be expressed as D=(U, V). This expression is referred to as a Mumford expression. The Mumford expression is described in documents such as Non-Patent Document 3.

$$U = \pi(x-x_i)^{m_i}$$

$$V(x_i) = y_i$$

$$V(x)^2 + V(x)h(x) - f(x) = 0 \bmod U(x), \deg V < \deg U \quad \text{Equation 2}$$

By using the Mumford expression, any reduced divisor D for a genus of 2 can be expressed by a set of polynomials each having elements over the finite field set in the coefficients of the polynomial and having an order not exceeding 2. That is to say, the reduced divisor can be expressed by the following equation:

$$(U, V) = (x^2 + u_1 x + u_0, v_1 x + v_0)$$

In addition, by using the Mumford expression, any reduced divisor D with a genus of 3 can be expressed by a set of polynomials each having elements over the finite field set in coefficients of the polynomial and having an order not exceeding 3. That is to say, the reduced divisor can be expressed by the following equation:

$$(U, V) = (x^3 + u_2 x^2 + u_1 x + u_0, v_2 x^2 + v_1 x + v_0)$$

Other expressions of a divisor include a modified Mumford expression and a weighted-coordinate expression. The modified Mumford expression corresponds to projective coordinates in the ECC (elliptic curve cryptography) and expresses the divisor as (U, V, Z), which is obtained by multiplying the Mumford expression (U, V) by a constant Z.

By the same token, the weighted-coordinate expression expresses the divisor as (U, V, Z1, Z2), which is obtained by multiplying the Mumford expression (U, V) by a plurality of constants Z1 and Z2. Both the modified Mumford expression and the weighted-coordinate expression are each used as a technique for reducing the amount of computation of a Harley algorithm described below.

The following pieces of processing on a hyperelliptic curve are explained:

[1] Addition processing (including doubling computation)
[2] Scalar multiplication processing
[3] Base-point generation processing It is to be noted that, in the following description, the technical term "divisor D" used in this specification is a reduced divisor unless otherwise specified. As described above, a reduced divisor is a semi reduced divisor having a weight not exceeding the genus g.

[1] Addition Processing (Including Doubling Computation)

First of all, an algorithm of addition of points on a hyperelliptic curve is explained.

The scalar multiplication of a divisor can be carried out as a combination of the addition of the divisor and the doubling computation of the divisor. An algorithm of the addition of a divisor is referred to as an addition algorithm. Addition algorithms known so far are explained as follows.

A first proposed practical algorithm is called a Cantor algorithm. The Cantor algorithm is described in Non-Patent Documents 1 and 2. This Cantor algorithm is applicable to a divisor on a hyperelliptic curve of any genus. In comparison with an elliptic curve algorithm, however, the Cantor algorithm has shortcomings that it is complex and entails a large amount of computation.

A Harley algorithm is a proposed addition algorithm limited to hyperelliptic curves each having a genus of 2. According to the Harley algorithm, computation processing is divided into processing cases in accordance with divisor weights, and optimization is applied on a case-by-case basis in order to reduce the amount of computation. On the basis of results of this research on the Harley algorithm, in recent years, various kinds of research are conducted to improve and extend algorithms of computation in the HECC (hyperelliptic curve cryptography).

In accordance with the Harley algorithm, the definition body is used as a prime field and the Mumford expression is adopted as an expression of a divisor on a curve with a genus of 2. Typical research to reduce the amount of computation based on this algorithm is disclosed in Non-Patent Documents 4, 5 and 6. In addition, pieces of typical extended processing with the definition body used as the two extension fields are reported in Non-Patent Documents 7 and 8. Furthermore, pieces of processing extended to the Harley algorithm for a genus of 3 are reported in Non-Patent Documents 9 and 10. On top of that, Non-Patent Documents 11, 12, 6 and 13 disclose researches to reduce the amount of computation by using the Mumford expression to express a divisor and adopting the weighted coordinates.

Processing adopting the Harley algorithm is explained by referring to FIGS. 1 and 2. FIG. 1A is a diagram showing typical processing to find a sum of $(D_1+D_2)$ where $D_1$ and $D_2$ are each a divisor with a genus of 2. It is to be noted that divisors $D_1$ and $D_2$ are expressed as follows: $D_1=(U_1, V_1)$ and $D_2=(U_2, V_2)$. First of all, the processing is divided into processing cases in accordance with the values of the divisors. That is to say, the addition $[D_1+D_2]$ of the divisor $D_1$ to the divisor $D_2$ is divided into processing cases in accordance with the values of weights of $D_1$ and $D_2$ as follows:

(1): weight of 2+weight of 2
(2): weight of 2+weight of 1
(3): exception processing 1

Next, in the case of addition of a weight of 2 to a weight of 2 itself, that is, in processing case (1) of a weight of 2+a weight of 2, if the greatest common denominator gcd $(U_1, U_2)$ for the two divisors $D_1=(U_1, V_1)$ and $D_2=(U_2, V_2)$ is 1 or if gcd $(U_1, U_2)=1$, the two divisors $D_1=(U_1, V_1)$ and $D_2=(U_2, V_2)$ do not include a common point or points opposite to each other. In this case, HarleyADD shown in the figure as processing (1a) is carried out. That is to say, addition processing based on the Harley algorithm is carried out. The processing of HarleyADD is processing referred to as a most frequent case disclosed in documents such as Non-Patent Document 7. The most frequent case is a case occurring at the highest probability in the addition processing to find a sum of $(D_1+D_2)$ of divisors for a genus of 2.

The processing of HarleyADD carried out as a most frequent case in the addition processing to find a sum of divisors for a genus of 2 is shown in Table 1 as follows:

TABLE 1

HarleyADD(genus 2)

Input: $D_1 = (u_1, v_1)$, deg $u_1 = 2$, $D_2 = (u_2, v_2)$, deg $u_2 = 2$
Output: $D_3 = (u_3, v_3) = D_1 + D_2$

| | | |
|---|---|---|
| 1 | Compute $r = \text{res}(u_1, u_2)$: | 4M |
| | $w_1 \leftarrow u_{11} + u_{21}, w_0 \leftarrow u_{21}w_1 + u_{10} + u_{20}, r \leftarrow (u_{10} + u_{20})w_0 + u_{20}w_1^2$; | |
| 2 | Compute $I = i_1 x + i_0 \equiv r u_1^{-1} \bmod u_2$ | |
| | $i_1 \leftarrow w_1, i_0 \leftarrow w_0$; | |
| 3 | Compute $T = t_1 x + t_0 \equiv (v_1 + v_2)I \bmod u_2$: | 5M |
| | $t_2 \leftarrow (v_{11} + v_{21})w_1, t_0 \leftarrow (v_{10} + v_{20})w_0$, | |
| | $t_1 \leftarrow (v_{11} + v_{21} + v_{10} + v_{20})(w_0 + w_1) + t_2 + t_0$, | |
| | $t_1 \leftarrow t_1 + t_2 u_{21}, t_0 \leftarrow t_0 + t_2 u_{20}$; | |
| 4 | If $t_1 = 0$ then call sub-procedure. | |
| 5 | Compute $S = s_1 x + s_0$: | 1I + 6M |
| | $w_2 \leftarrow (rt_1)^{-1}, w_3 \leftarrow w_2 r, w_4 \leftarrow w_2 t_1, w_5 \leftarrow w_3 r, s_1 \leftarrow w_4 t_1, s_0 \leftarrow w_4 t_0$; | |
| 6 | Compute $u_3 = x^2 + u_{31}x + u_{30} = s_1^{-2}(f + h(Su_1 + v_1) + (Su_1 + v_1)^2)/u_1 u_2$: | 5M |
| | $u_{31} \leftarrow w_1 + w_5(1 + w_5), u_{30} \leftarrow u_{21}w_1 + u_{10} + u_{20} + w_5(s_0 + s_0^2 + w1)$; | |
| 7 | Compute $v_3 = v_{31}x + v_{30} \equiv Su_1 + v_1 + h \bmod u_3$: | 5M |
| | $w_1 \leftarrow u_{11} + u_{31}, w_0 \leftarrow u_{10} + u_{30}, w_2 \leftarrow s_1 w_1, w_3 \leftarrow s_0 w_0$, | |
| | $w_4 \leftarrow (s_1 + s_0)(w_1 + w_0) + w_2 + w_3, w_2 \leftarrow w_2 + 1, w_1 \leftarrow w_4 + w_2 u_{31}$, | |
| | $w_0 \leftarrow w_3 + w_2 u_{30}, V_{31} \leftarrow w_1 + v_{11} + h_1, v_{30} \leftarrow w_0 + v_{10} + h_0$: | |
| total | HarleyADD | 1I + 25M |
| | | Equation 3 |

The processing of HarleyADD (1a) occurs at a very high probability as will be described later. The probability at which other pieces of typical processing occur is very low. If conditions of the most frequent case are not satisfied, that is, if "the greatest common denominator gcd $(U_1, U_2)$ for the two divisors $D_1 = (U_1, V_1)$ and $D_2 = (U_2, V_2)$ is 1" is not satisfied or if "gcd $(U_1, U_2) = 1$" is not satisfied, exception processing 2 shown in the figure as processing (1b) is carried out.

Also for processing case (2) of a weight of 2+a weight of 1, in the same way, gcd $(U_1, U_2)$ is checked to determine whether or not gcd $(U_1, U_2) = 1$. If "gcd $(U_1, U_2) = 1$" is satisfied, ExHarADD$^{2+1 \rightarrow 2}$ shown in the figure as processing (2a) is carried out. If "gcd $(U_1, U_2) = 1$" is not satisfied, on the other hand, exception processing 3 shown in the figure as processing (2b) is carried out.

The algorithm of ExHarADD$^{2+1 \rightarrow 2}$ shown in the figure as processing (2a) is disclosed in Non-Patent Document 8. The processing of ExHarADD$^{2+1 \rightarrow 2}$ is shown in Table 3 as follows.

TABLE 3

ExHarADD$^{2+1 \rightarrow 2}$

Input: $D_1 = (u_1, v_1)$, deg $u_1 = 1$, $D_2 = (u_2, v_2)$, deg $u_2 = 2$
Output: $D_3 = (u_3, v_3) = D_1 + D_2$

| | | |
|---|---|---|
| 1 | Compute $r = u_2 \bmod u_1$ | 1M |
| | $r \leftarrow u_{20} + (u_{21} + u_{10})u_{10}$. | |
| 2 | Compute inverse of $u_2 \bmod u_1$: | 1I |
| | $\text{inv} \leftarrow 1/r$. | |
| 3 | Compute $s_0 = \text{inv}(v_1 + v_2) \bmod u_1$: | 2M |
| | $s_0 \leftarrow \text{inv}(v_{10} + v_{20} + v_{21}u_{10})$. | |
| 4 | Compute $l = s \cdot u_2 = s_0 x^2 + l_1 x + l_0$: | 2M |
| | $l_1 \leftarrow s_0 u_{21}, l_0 \leftarrow s_0 u_{20}$. | |
| 5 | Compute $k = (f + v_2 h + v_2^2)/u_2 =$ $x^3 + k_2 x^2 + k_1 x + k_0$: | 1M |
| | $k_2 \leftarrow f_4 + u_{21}, k_1 \leftarrow f_3 + (f_4 + u_{21})u_{21} + v_{21} + u_{20}$. | |
| 6 | Compute $u_3 = (k + s(l + h))/u_1 = x^2 + u_{31}x + u_{30}$: | 3M |
| | $u_{31} \leftarrow k_2 + s_0^2 + s_0 + u_{10}$, | |
| | $u_{30} \leftarrow k_1 + s_0(l_1 + h_1) + u_{10} u_{31}$. | |

TABLE 3-continued

ExHarADD$^{2+1 \rightarrow 2}$

| | | |
|---|---|---|
| 7 | Compute $v_3 = v_{31}x + v_{30} \equiv (l + v_2) + h \bmod u_3$: | 2M |
| | $v_{31} \leftarrow u_{31}(h_2 + s_0) + (h_1 + l_1 + v_{21})$, | |
| | $v_{30} \leftarrow u_{30}(h_2 + s_0) + (h_0 + l_0 + v_{20})$. | |
| total | ExHarADD$^{2+1 \rightarrow 2}$ | 1I + 11M |
| | | Equation 4 |

Exception processing 1 shown in the figure as processing case (3) is carried out for a processing case other than processing cases (1) and (2) for weights.

The flow of the doubling multiplication for a genus of 2 is shown in FIG. 1B. The doubling multiplication is processing to compute D+D=2D. Much like the addition, different kinds of processing are carried out in accordance with the weights of the devisor D. The weights of the devisor D are listed as follows:

(4): a weight of 2

(5): a weight of 1 and (6): a weight of 0

In the case of a weight of 2 for processing case (4), the divisor is checked to determine whether or not the divisor includes a ramification point. If no ramification point is included, HarleyDBL shown in the figure as processing (4a) is carried out. If the divisor includes a ramification point, on the other hand, exception processing 6 shown in the figure as processing (4b) is carried out.

The processing of HarleyDBL shown in the figure as processing (4a) is processing disclosed in documents such as Non-Patent Document 7 as a most frequent case disclosed. The algorithm of the HarleyDBL processing is shown in Table 2 as follows.

TABLE 2

HarleyDBL(genus 2)

Input: $D_1 = (u_1, v_1)$, deg $u_1 = 2$
Output: $D_3 = (u_3, v_3) = 2D_1$

1. Compute $r = res(u_1, h)$:  4M
   $w_1 \leftarrow h_1 + u_{11}, w_0 \leftarrow h_0 + u_{10} + u_{11}w_1, r \leftarrow u_{10}(u_{10} + h_0 + h_1w_1) + h_0w_0;$
2. Compute $I = i_1x + i_0 \equiv rh^{-1} \bmod u_1$
   $i_1 \leftarrow w_1, i_0 \leftarrow w_0;$
3. Compute $T = t_1x + t_0 \equiv I(f + hv_1 + v_1^2)/u_1 \bmod u_1$:  8M
   $w_2 \leftarrow f_3 + v_{11} + v^2{}_{11}, w_3 \leftarrow v_{10} + v_{11}(v_{11} + h_1),$
   $t_1 \leftarrow w_0w_2 + w_1w_3, t_0 \leftarrow (u_{11}w_0 + u_{10}w_1)w_2 + w_0w_3;$
4. If $t_1 = 0$ then goto 5'.
5. Compute $S = s_1x + s_0$:  1I + 6M
   $w_0 \leftarrow (rt_1)^{-1}, w_2 \leftarrow w_0r, w_3 \leftarrow w_0t_1, w_4 \leftarrow w_2r, s_1 \leftarrow w_3t_1, s_0 \leftarrow w_3t_0;$
6. Compute $u_3 = x^2 + u_{31}x + u_{30} \equiv s_1^{-2}(f + h(Su_1 + v_1) + (Su_1 + v_1)^2)/u_1^2$:  4M
   $u_{31} \leftarrow w_4(1 + w_4), u_{30} \leftarrow w_4(w_4(s_0(1 + s_0)) + w_1);$
7. Compute $v_3 = v_{31}x + v_{30} \equiv Su_1 + v_1 + h \bmod u_3$:  5M
   $w_1 \leftarrow u_{11} + u_{31}, w_0 \leftarrow u_{10} + u_{30}, w_2 \leftarrow s_1w_1, w_3 \leftarrow s_0w_0,$
   $w_4 \leftarrow (s_1 + s_0)(w_1 + w_0) + w_2 + w_3, w_2 \leftarrow w_2 + 1, w_1 \leftarrow w_4 + w_2u_{31},$
   $w_0 \leftarrow w_3 + w_2u_{30}, v_{31} \leftarrow w_1 + v_{11} + h_1, v_{30} \leftarrow w_0 + v_{10} + h_0;$ total HarleyDBL  1I + 27M
Equation 5

---

Next, addition and doubling computation processes for a genus of 3 are explained by referring to FIGS. 2A and 2B. A basic concept adopted for the genus of 3 is the same as that for the genus of 2. In the case of the genus of 3, however, the largest weight of the divisor is 3. Thus, the addition and doubling computation processes for the genus of 3 are characterized in that the number of processing cases is extremely large in comparison with those for the genus of 2.

In the addition processing shown in FIG. 2A, divisors $D_1$ and $D_2$ are expressed as follows: $D_1 = (U_1, V_1)$ and $D_2 = (U_2, V_2)$. First of all, the processing is divided into processing cases in accordance with the values of the divisors. That is, the addition $[D_1 + D_2]$ to add $D_1$ to $D_2$ is divided into processing cases in accordance with the values of weights $D_1$ and $D_2$ as follows:

(1): weight of 3+weight of 3
(2): weight of 3+weight of 2
(3): weight of 3+weight of 1
(4): exception processing 7

Next, in the case of addition of a weight of 3 to a weight of 3 itself, that is, in processing case (1) of a weight of 3+a weight of 3, if "the greatest common denominator gcd $(U_1, U_2)$ for the two divisors $D_1 = (U_1, V_1)$ and $D_2 = (U_2, V_2)$ is 1 or if gcd $(U_1, U_2) = 1$", HarleyADD shown in the figure as processing (1a) is carried out. The processing of HarleyADD 1a is processing referred to as most frequent case for the genus of 3.

The HarleyADD processing, which is the most frequent case in the addition processing to find a sum of divisors with the genus of 3, is disclosed in documents such as Non-Patent Documents 9 and 10. The algorithm adopted in the HarleyADD processing carried out as a most frequent case in the addition processing to find a sum of divisors with the genus of 3 is shown in Table 4 as follows:

TABLE 4

HarleyADD(genus 3)

Input: $D_1 = (u_1, v_1)$, deg $u_1 = 3$, $D_2 = (u_2, v_2)$, deg $u_2 = 3$
Output: $D_3 = (u_3, v_3) = D_1 + D_2$ 1. Compute $r = res(u_1, u_2)$:  14M
2. Compute almost inverse $inv \equiv r/u_1 \bmod u_2$:  4M TABLE 4-continued HarleyADD(genus 3)

3. Compute $s' = rs \equiv inv(v_1 + v_2) \bmod u_2$:  11M
4. Compute $s = (s'/r)$ and make s monic:  1I + 8M
5. Compute $z = su_1$:  6M
6. Compute $u_3 = (s(z + w_4h) - w_s(f + hv_1 + v^1)/u_1)/u_2$:  16M
7. Compute $v_3 = -(w_3z + h + v_1) \bmod u_3$:  8M
8. Compute $u_3 = (f + hv + v^2)/u_3$:  8M
9. Compute $v_3 = v_{32}x^2 + v_{31}x + v_{30} \equiv v_3 + h \bmod u_3$:  3M total Harley ADD  1I + 78M
Equation 6

By the same token, in processing case (2) of a weight of 3+a weight of 2, if "the greatest common denominator gcd $(U_1, U_2)$ for the two divisors $D_1 = (U_1, V_1)$ and $D_2 = (U_2, V_2)$ is 1" or if "gcd $(U_1, U_2) = 1$" is satisfied, ExHarADD$^{3+2 \rightarrow 3}$ shown in the figure as processing (2a) is carried out. If "the greatest common denominator gcd $(U_1, U_2) = 1$" is not satisfied, on the other hand, exception processing 9 shown in the figure as processing (2b) is carried out.

In the same way, in processing case (3) of a weight of 3+a weight of 1, if "the greatest common denominator gcd $(U_1, U_2)$ for the two divisors $D_1 = (U_1, V_1)$ and $D_2 = (U_2, V_2)$ is 1" or if "gcd $(U_1, U_2) = 1$" is satisfied, ExHarADD$^{3+1 \rightarrow 3}$ shown in the figure as processing (3a) is carried out. If "the greatest common denominator gcd $(U_1, U_2) = 1$" is not satisfied, on the other hand, exception processing 10 shown in the figure as processing (3b) is carried out.

Since the algorithms of the pieces of processing are not disclosed explicitly in any documents, formulas for the definition body of $F_2{}^n$ have been derived. As a result, the algorithms of ExHarADD$^{3+1 \rightarrow 3}$ and ExHarADD$^{3+2 \rightarrow 3}$ are obtained as shown in tables 6 and 7, respectively.

TABLE 6

ExHarADD$^{3+1\to 3}$

Input: $D_1 = (u_1, v_1)$, deg $u_1 = 3$, $D_2 = (u_2, v_2)$, deg $u_2 = 1$
Output: $D_3 = (u_3, v_3) = D_1 + D_2$ 1. Compute $r = \text{res}(u_1, u_2)$:     3M
   $w_0 \leftarrow u_{20}^2, w_1 \leftarrow w_0(u + 12 + u_{20}), w_2 \leftarrow u_{20}u_{11}, r \leftarrow w_1 + w_2 + u_{10}$.
2. Compute inverse of $u_1 \bmod u_2$:     1I
   inv $\leftarrow 1/r$.
3. Compute $s_0 = \text{inv}(v_1 + v_2) \bmod u_2$:     3M
   $z_0 \leftarrow w_0 v_{12}, s_0 \leftarrow \text{inv}(v_{10} + v_{20} + u_{20}v_{11} + z_0)$.
4. Compute $u_3 = (f + hv + v^2)/(u_1 u_2), v = s_0 u_1 + v_1$:     12M
   $u_{32} \leftarrow s_0^2 + s_0 + u_{20} + u_{12} + f_0$
   $t_0 \leftarrow F_6 + s_0^2 + u_{12}, t_1 \leftarrow u_{12}t_0, t_2 \leftarrow u_{20}u_{32}, t_3 \leftarrow h_2 s_0$,
   $u_{31} \leftarrow t_1 + t_2 + t_3 + u_{11} + v_{12} + f_5$,
   $t_4 \leftarrow u_{20}(t_6 + v_{12} + f_5 + t_3 + u_{11}), t_5 \leftarrow v_{12}(v_{12} + u_{12} + h_2)$,
   $t_6 \leftarrow u_{12}(u_{12}(f_6 + u_{12}) + f_5)$,
   $u_{30} \leftarrow w_0 u_{32} + t_4 + t_5 + u_{12}t_0 + s_0 h_1 + t_6 + u_{10} + f_4 + v_{11}$.
5. Compute $v_3 = v_{32}x^2 + v_{31}x + v_{30} \equiv s_0 u_1 + v_1 + h \bmod u_3$:     3M
   $v_{32} \leftarrow v_{12} + h_2 + s_0(u_{12} + u_{32}) + u_{32}$,
   $v_{31} \leftarrow v_{11} + h_2 + s_0(u_{11} + u_{31}) + u_{31}$,
   $v_{30} \leftarrow v_{10} + h_2 + s_0(u_{10} + u_{30}) + u_{30}$.

total ExHarADD$^{3+1\to 3}$     1I + 21M
Equation 7

TABLE 7

ExHarADD$^{3+2\to 3}$

Input: $D_1 = (u_1, v_1)$, deg $u_1 = 3$, $D_1 = (u_2, v_2)$, deg $u_2 = 2$
Output: $D_3 = (u_3, v_3) = D_1 + D_2$ 1. Computer $r = \text{res}(u_1, u_2)$:     11M
   $w_0 \leftarrow u_{20}^2, w_1 \leftarrow u_{11}^2, w_2 \leftarrow u_{21}^2, w_3 \leftarrow u_{12} + u_{21}$,
   $w_4 \leftarrow w_0 + (u_{20} + u_{12}w_3), w_5 \leftarrow u_{21}(u_{10} + u_{11}w_3), w_5 \leftarrow u_{20}(w_5 + w_1)$,
   $w_6 \leftarrow w_3 w_2 + u_{21}u_{11} + u_{10}(u_{10} + w_6), r \leftarrow w_4 + w_5 + w_6$
2. Compute $ru_1^{-1} \bmod u_2 = i_1 x + i_0$:     4M
   $i_2 \leftarrow u_{21}u_{12}, i_3 \leftarrow u_{21}u_{11}, i_4 \leftarrow u_{20}u_{12}$,
   $i_1 \leftarrow i_2 + w_2 + u_{20} + u_{11}, i_0 \leftarrow w_2 w_3 + i_3 + i_4 + u_{10}$
3. Compute $t \equiv t_1 x + t_0 = r(v_1 + v_2)u_1^{-1} \bmod u_2$:     7M
   $c_1 \leftarrow v_{11} + v_{21} + v_{12}u_{21}, c_0 \leftarrow v_{20} + v_{10} + v_{12}u_{20}$,
   $t_2 \leftarrow i_1 c_1, t_3 \leftarrow i_0 c_0, t1 = t_2 u_{21} + (i_1 + i_0)(c_1 + c_0) + t_2 + t_3$,
   $t_0 \leftarrow t_3 + t_2 u_{20}$.
4. Compute $s = 1/r \equiv s_1 x + s_0$:     1I + 6M
   $z_1 \leftarrow rt_1, z_2 \leftarrow 1/z_1, z_3 \leftarrow z_2 r, z_4 \leftarrow z_2 t_1, z5 \leftarrow z_3 r, s_1 \leftarrow z_4 t_1, s_0 \leftarrow z_4 t_0$,
5. Compute $v = su_1 + v_1 \equiv s_1 x^4 + k_3 x^3 + k_2 x^2 + k_1 x + k_0$:     5M
   $t_0 \leftarrow s_0 u_{12}, t_1 \leftarrow s_0 u_{10}, t_2 \leftarrow s_1 u_{11}$,
   $k_3 \leftarrow (s_1 + s_0)(1 + u_{12}) + s_1 + t_0, k_2 \leftarrow t_0 + t_2 + v_{12}$,
   $k_1 \leftarrow (s_1 + s_0)(u_{11} + u_{10}) + t_2 + t_1 + v_{11}, k_0 \leftarrow t_1 + v_{10}$.
6. Compute $u_3 = s_1^{-2}(f + hv + v^2)/(u_1 u_2)$:     11M
   $u_{32} \leftarrow z_5(z_5 + 1) + u_{12} + u_{21}, t_0 \leftarrow k_3^2, t_1 \leftarrow u_{12}^2$,
   $t_2 \leftarrow z_5(z_5(f_0 + u_{12} + u_{21} + t_0 + k_3) + u_{21} + h_2 + u_{12})$,
   $u_{31} \leftarrow i_2 + u_{11} + u_{20} + t_1 + w_2 + t_2$,
   $t_3 \leftarrow (t_1 + w_2)(u_{21} + u_1 2) + i_3 + i_4 + u_{10}$,
   $t_4 \leftarrow i_2 + u_{20} + w_2 + u_{11} + t_1 + f_5 + (u_{21} + u_{12})(t_0 + f_0 + k_3) + k_2$,
   $t_4 \leftarrow z_5(t_4 + k_3 h_2) + h_2(u_{12} + u_{21}) + t_1 + w_2 + i_2 + u_{20} + u_{11} + h_1, t_4 \leftarrow z_5 t_4$,
   $u_{30} \leftarrow t_3 + t_4$.
7. Compute $v_3 = v_{32}x^2 + v_{31}x + v_{30} \equiv su_1 + v_1 + h \bmod u_3$:     8M
   $t_0 \leftarrow s_0(u_{32} + u_{12}), t_1 \leftarrow s_1(u_{31} + u_{11}), t_2 \leftarrow s_1(u_{12} + u_{32})$,
   $v_{32} \leftarrow t_0 + t_1 + t_2 u_{32} + u_{32} + v_{12} + h_2$,
   $t_4 \leftarrow s0(u_{30} + u_{10}), t_5 \leftarrow (s_1 + s_0)(u_{31} + u_{11} + u_{30} + u_{10})$,
   $v_{31} \leftarrow t_5 + t_1 + t_4 + t_2 u_{31} + u_{31} + v_{11} + h_1$,
   $v_{30} \leftarrow t_4 + t_2 u_{30} + u_{30} + v_{10} + h_0$.

total ExHarADD$^{3+2\to 3}$     1I + 52M
Equation 8

The flow of the doubling computation for a genus of 3 is shown in FIG. 2B. The doubling computation of a divisor D is processing to compute D+D=2D. Much like the addition, different kinds of processing are carried out in accordance with the weights of the devisor D. The weights of the devisor D are listed as follows:

(5): a weight of 3
(6): a weight of 2
(7): a weight of 1 and
(8): a weight of 0.

In the case of a weight of 3 for weight classification (5) shown above, the divisor is checked to determine whether or not it includes a ramification point. If a ramification point is not included, HarleyDBL shown in the figure as processing (5a) is carried out. If the divisor D includes a ramification point, on the other hand, exception processing 11 shown in the figure as processing (5b) is carried out.

The processing algorithm of HarleyDBL (5a) is disclosed in documents such as Non-Patent Documents 9 and 10 as a most frequent case. The processing algorithm of HarleyDBL 5a is shown in Table 5 as follows:

TABLE 5

HarleyDBL(genus 3)

Input: $D_1 = (u_1, v_1)$, deg $u_1 = 3$
Output: $D_3 = (u_3, v_3) = 2D_1$

| | | |
|---|---|---|
| 1 | Compute r = res($u_1$, h): | 15M |
| 2 | Compute almost inverse inv ≡ r/h mod $u_1$: | 4M |
| 3 | Compute z = (f + h$v_1$ + $v_1^2$)/$u_1$ mod $u_1$: | 12M |
| 4 | Compute s' = z · inv mod $u_1$: | 11M |
| 5 | Compute s = (s'/r) and make s monic: | 1I + 8M |
| 6 | Compute G = s$u_1$: | 6M |
| 7 | Compute u' = $s_1^{-2}[(G + w_4v_1)^2 + w_4hG + w_5(hv_1 + f)]$: | 6M |
| 8 | Compute v' = C$w_3$ + h + $v_1$ mod u': | 8M |
| 9 | Compute $u_3$ = (f + hv + $v^2$)/u': | 8M |
| 10 | Compute $v_3$ = v' + h mod $u_3$: | 3M |
| total | HarleyDBL | 1I + 81M |

Equation 9

In the case of both the genuses of 2 and 3, HarleyADD and HarleyDBL are referred to as a most frequent case. If a divisor is generated at random and is subjected to an addition or doubling-computation process, the process becomes HarleyADD or HarleyDBL at a very high probability. It is to be noted that a document such as Non-Patent Document 14 explains HarleyADD and HarleyDBL as processing becoming a most frequent case.

In accordance with Non-Patent Document 14, the probability of becoming processing other than the most frequent case is O (1/q) where notation q denotes the number of elements in the definition body. In safe cryptography applications, $q^g$ is a large number having a size of about 160 bits. Thus, in actuality, it is possible to assume a situation in which processing can become only HarleyADD or HarleyDBL.

Thus, if the addition algorithm of the HECC (hyperelliptic curve cryptography) is implemented as cryptography-computation-processing means such as an IC card, only HarleyADD and HarleyDBL are realized. In such an implementation, execution of other complex exception processing most unlikely to occur is not realized in many cases. In such cases, a specific method is adopted. This specific method typically has a configuration for executing a Cantor algorithm, which does not require the division of divisor weights into processing cases. Since the larger the genus, the heavier the load of the complex exception processing, this implementation method is specially described in Non-Patent Documents 9 and 10.

[2]: Scalar Multiplication

Next, scalar multiplication in the algorithm of the HECC (hyperelliptic curve cryptography) is explained.

In the algorithm of the HECC (hyperelliptic curve cryptography), scalar multiplication of a divisor is carried out as a combination of hyperelliptic addition and hyperelliptic doubling computation. The algorithm of the scalar multiplication is explained by taking a basic binary method and a basic double-and-add-always method as examples.

In this case, a binary expression of d is given as follows:

$(d_{l-1}, ---, d_0)$, $d_{l-1}=1$, $d_{l-2}, ---, _0=1$ or 0.

As a scalar multiplication, the processing algorithm of the basic binary method is described as follows.

```
Input $D_0$
Output D = d$D_0$
D ← $D_0$
for i from l - 2 to 0
  {
  D ← 2D      //Harley DBL doubling computation ↵
  if $d_i$ = 1 then D ← D + $D_0$   //Harley ADD addition
  }
return D
```

Equation 10

Next, the processing algorithm of the double-and-add-always method is explained.

A method of acquiring secret information by making use of a problem raised by an implementation method of the cryptography technology is referred to as a side channel attack (SCA). The SCA includes a timing attack (TA), a simple power analysis (SPA) and power attacks such as a differential power analysis (DPA). The timing attack (TA) is described in Non-Patent Document 15 and the power attacks are described in Non-Patent Document 16.

As a measure for the simple power analysis (SPA) and the timing attack (TA) for the elliptic curve cryptography (ECC) as well as the hyperelliptic curve cryptography (HECC), the double-and-add-always method is adopted. Details of the double-and-add-always method are described in Non-Patent Document 17.

As an algorithm of the scalar multiplication, the processing algorithm of the basic double-and-add-always method is expressed as follows.

```
Input $D_0$
Output D = d$D_0$
D[0] ← $D_0$
for i from l - 2 to 0
  {
  D[0] ← 2D[0]        //Harley DBL doubling computation ↵
  D[1] ← D[0] + $D_0$   //Harley ADD addition ↵
  D[0] ← D[$d_i$]
  }
return D[0]
```

Equation 11

[3]: Base-Point Generation

When the scalar computation is applied to a cryptography technology, divisors $D_0$ necessary for the input are divided into the following two types:

(1): a divisor determined in advance and
(2): a divisor undeterminable in advance and generated at random.

In the case of type (1) representing divisors determined in advance, the input divisor is referred to as a base point. A general algorithm for generating a base point is described as follows.

(a): g elements on a definition body $F_q$ are selected at random and g points $P_i$ (where i=1, - - -, g) on a hyperelliptic curve are generated.

(a1): The elements selected at random are used as x coordinates $x_i$ (where i=1, - - -, g). Then, such y coordinates are determined for the x coordinates that every point (x, y) is positioned on the hyperelliptic curve.

(b): Let the divisor of the base point be expressed as follows:

$D_0 = (U(x), V(x))$ (b1): $U(x) = (x-x_1)(x-X_2) - - - (x-x_g)$ (b2): Coefficients $v_i$ of an equation $V(x) = v_{g-1}x^{g-1} + v_{g-2}x^{g-2} + - - - + v_0$ are determined. If the generated points are all different from each other, for example, the coefficients $v_i$ can be found from an equation $V(x_i) = y_i$.

(c): The divisors generated in accordance with the above algorithm are each a divisor with a weight equal to the genus g.

If the computation of the scalar multiplication is applied to the cryptography technology, a divisor $D_0$ required in the input is generated. That is, a base point is generated. In the process to generate the base point, if divisors determined in advance are applied, it is possible to find a divisor with a weight equal to the genus g as a divisor usable as a base point by carrying out the processes (a) to (c).

[Non-Patent Document 1]
N. Koblitz. Hyperelliptic curve cryptosystems. J. Cryptology, vol. 1, No. 3, pp. 139-150, 1989.

[Non-Patent Document 2]
D. G. Cantor. Computing in the Jacobian of hyperelliptic curve. Math. Comp., Vol. 48, No. 177, pp. 95-101, 1987.

[Non-Patent Document 3]
D. Mumford, Tata lectures on theta II, Progress in Mathematics, no. 43, Birkhauser, 1984.

[Non-Patent Document 4]
K. Matsuo, J. Chao and S. Tsujiii. Fast Genus two hyperelliptic curve cryptosystems. Technical Report ISEC2001-31, IEICE Japan, 2001.

[Non-Patent Document 5]
M. Takahashi. Improving Harley algorithms for Jacobians of genus 2 hyperelliptic curves. SCIS2002. (Japanese).

[Non-Patent Document 6]
T. Lange. Inversion-free arithmetic on genus 2 hyperelliptic curves. Cryptology eprint Archive, 2002/147, IACR, 2002.

[Non-Patent Document 7]
T. Sugizaki, K. Matsuo, J. Chao and S. Tsujiii. An extension of Harley addition algorithm for hyperelliptic curves over finite fields of characteristic two. ISEC2002-9, IEICE, 2001.

[Non-Patent Document 8]
T. Lange. Efficient arithmetic on genius 2 hyperelliptic curves over finite fields via explicit formulae. Cryptology ePrint Archive, 2002/121, IACR, 2002.

[Non-Patent Document 9]
J. Kuroki, M. Gonda, K. Masuo, J. Chao and S. Tsujii. Fast genus three hyperelliptic curve cryptosystems. SCIS2002.

[Non-Patent Document 10]
J. Pelzl, T. Wollinger, J. Guajardo and C. Paar. Hyperelliptic curve Cryptosystems: Closing the Performance Gap to Elliptic Curves. Cryptology eprint Archive, 2003/026, IACR, 2003.

[Non-Patent Document 11]
Y. Miyamoto, H. Doi, K. Masuo, J. Chao and S. Tsujii. A fast addition algorithm of genus two hyperelliptic curves. SCI2002. (Japanese).

[Non-Patent Document 12]
N. Takahashi, H. Morimoto and A. Miyaji. Efficient exponentiation on genus two hyperelliptic curves (II). ISEC2002-145, IEICE, 2003. (Japanese).

[Non-Patent Document 13]
T. Lange. Weighed coordinate on genus 2 hyperelliptic curve. Cryptology ePrint Archive, 2002/153, IACR, 2002.

[Non-Patent Document 14]
N. Nagao. Improving group law algorithms for Jacobians of hyperelliptic curves. ANTS-IV, LNCS 1838, pp. 439-448, Springer-Verlag, 2000.

[Non-Patent Document 15]
C. Kocher. Timing Attacks on Implementations of Diffie-Helman, RSA, DSS and Other Systems, CRYPTO '96, LNCS 1109, pp. 104-113, 1996.

[Non-Patent Document 16]
C. Kocher, J. Jaffe and B. Jun. Differential Power Analysis, CRYPTO '99, LNCS 1666, pp. 388-397, Springer-Verlag, 1999.

[Non-Patent Document 17]
J.-S. Coron. Resistance against Differential Power Analysis for Elliptic Curve Cryptosystems, CHES '99, LNCS 1717, pp. 292-302, Springer-Verlag, 1999.

SUMMARY OF THE INVENTION

The HECC (hyperelliptic curve cryptography) algorithm is a concept of extension of the ECC (elliptic curve cryptography) algorithm, which is entering the phase of practical use. Nowadays, at the academic-society level, research on high-speed versions of the HECC algorithm and methods of implementing the algorithms is making progress. Nevertheless, the processing time of the scalar multiplication based on the HECC (hyperelliptic curve cryptography) algorithm merely approaches that of the ECC (elliptic curve cryptography) algorithm in spite of the fact that higher speeds are desired.

It is thus an object of the present invention, which addresses the problems described above, to provide a cryptography-processing method for decreasing the processing time of scalar multiplication of the HECC (hyperelliptic curve cryptography) in order to implement high-speed HECC (hyperelliptic curve cryptography) processing, provide a cryptography-processing apparatus adopting the cryptography-processing method and provide a computer program implementing the cryptography-processing method.

In other words, it is an object of the present invention to provide a cryptography-processing method for increasing the processing speed of scalar multiplication of the hyperelliptic curve cryptography (HECC) by deliberately utilizing processing with a small amount of computation in order to implement high-speed HECC (hyperelliptic curve cryptography) processing, provide a cryptography-processing apparatus adopting the cryptography-processing method and provide a computer program implementing the cryptography-processing method. In this case, the processing with a small amount of computation is processing not normally carried out as well as processing other than those included in a category of the most frequent case.

According to an aspect of the present invention, there is provided a cryptography-processing method for carrying out cryptography-processing computation based on hyperelliptic curve cryptography, the cryptography-processing method including:

a base-point generation step of generating a divisor having a weight $g_0$ smaller than a genus g of a hyperelliptic curve to serve as a base point where $1 \leq g_0 < g$; and a computation-processing step of carrying out scalar multiplication processing of divisors including the divisor serving as the base point.

According to another aspect of the present invention, there is provided a cryptography-processing apparatus for carrying out cryptography-processing computations based on hyperelliptic curve cryptography, the cryptography-processing apparatus including:

base-point generation unit for generating a divisor having a weight $g_0$ smaller than a genus g of a hyperelliptic curve to serve as a base point where $1 \leq g_0 < g$; and computation-processing unit for carrying out scalar multiplication processing of divisors including the divisor serving as the base point.

According to still another aspect of the present invention, there is provided a computer program for carrying out cryptography-processing computations based on hyperelliptic curve cryptography, the computer program including:

a base-point generation step of generating a divisor having a weight $g_0$ smaller than genus g of a hyperelliptic curve to serve as a base point where $1 \leq g_0 < g$; and a computation-processing step of carrying out scalar multiplication processing of divisors including the divisor serving as the base point.

It is to be noted that the computer programs are each a program that can be presented to typically a computer system capable of executing a variety of program codes. The computer programs are presented to the computer system by storing the programs in a recording medium such as a CD, an FD and an MO or by downloading the programs through a communication medium such as a network in the form readable to the computer system. By presenting or downloading the programs to the computer system in the form readable to the computer system, the computer system is capable of carrying out pieces of processing corresponding to the programs.

Other objects of the present invention as well as its characteristics and its merits will probably become apparent from the following detailed description of preferred embodiments of the present invention with reference to accompanying diagrams. It is to be noted that the technical term "system" used in this specification means the configuration of a logical confluence including a plurality of apparatus, which are not necessarily accommodated in the same chassis.

In accordance with the configuration of the present invention, in cryptography-processing computations based on hyperelliptic curve cryptography, a divisor having a weight $g_0$ smaller than the genus g of a hyperelliptic curve where $1 \leq g_0 < g$ is generated to serve as a base point. Thus, processing carried out in scalar multiplication can be converted from execution steps of HarleyADD into execution steps of ExHarADD$^{2+1 \rightarrow 2}$ with a small number of computation-processing steps in the case of hyperelliptic curve cryptography with a typical genus of 2. In the case of hyperelliptic curve cryptography with a typical genus of 3, on the other hand, the processing carried out in scalar multiplication can be converted from execution steps of HarleyADD into execution steps of ExHarADD$^{3+2 \rightarrow 3}$ or ExHarADD$^{3+1 \rightarrow 3}$ with a small number of computation-processing steps.

In addition, in accordance with the configuration of the present invention, a base-point generation process is carried out to generate a divisor, which is one among divisors each having a weight $g_0$ smaller than the genus g of the hyperelliptic curve where $1 \leq g_0 < g$ and represented by a Mumford expression with a polynomial including at least a coefficient of 0 or 1, to serve as a base point. Thus, the number of computation-processing steps can be further reduced to implement high-speed processing of the hyperelliptic curve cryptography.

BRIEF DESCRIPTION OF THE DRAWINGS

FIG. 5 is a block diagram showing the functional configuration of a cryptography-processing apparatus provided by the present invention; and FIG. 6 is a diagram showing a typical configuration of an IC module serving as a typical cryptography-processing device for cryptography-processing computation in accordance with the present invention.

DETAILED DESCRIPTION OF THE PREFERRED EMBODIMENTS

Figure 1:
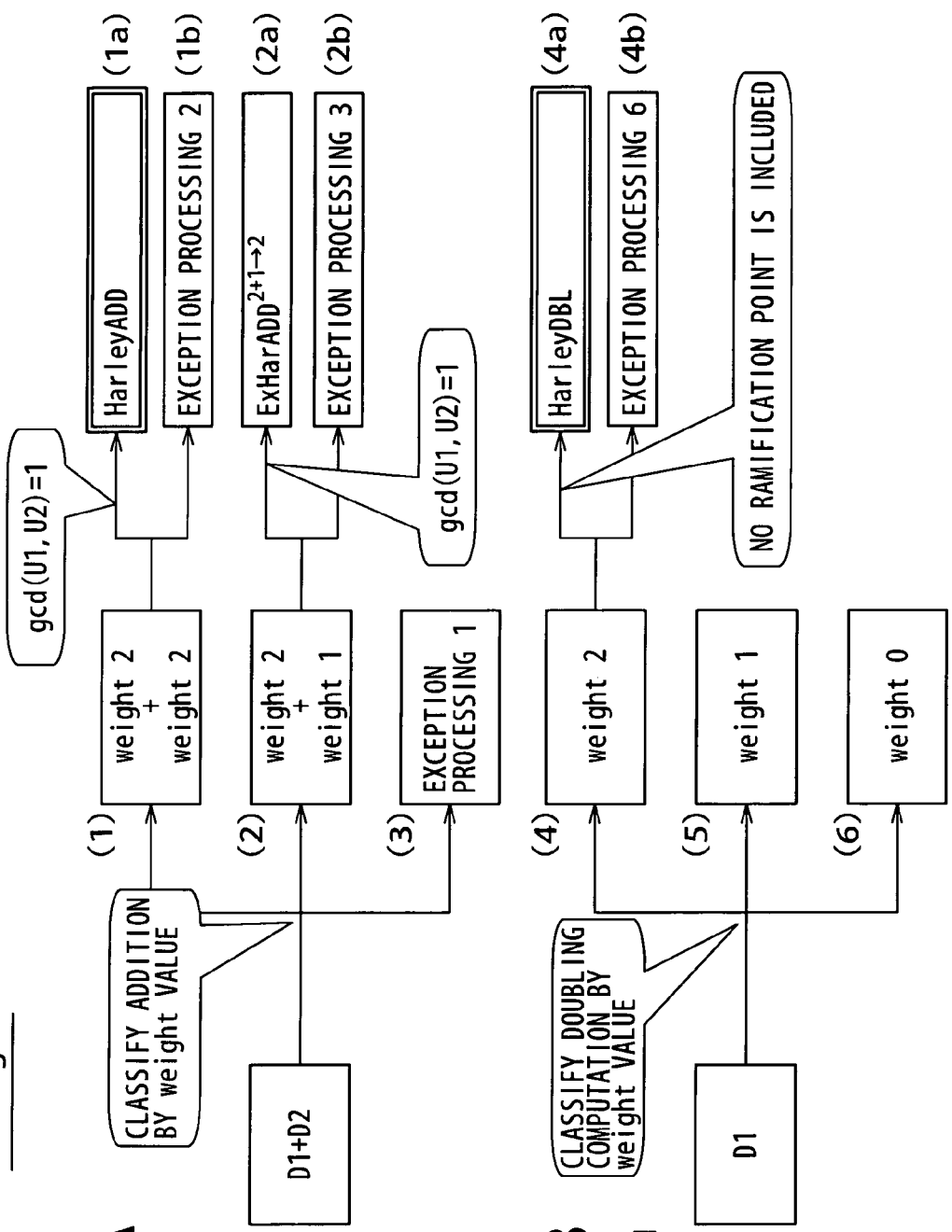
FIGS. 1A and 1B are explanatory diagrams referred to in explaining algorithms of addition and doubling computation in scalar multiplication processing of hyperelliptic curve cryptography for a hyperelliptic curve having a genus of 2.
Figure 2:
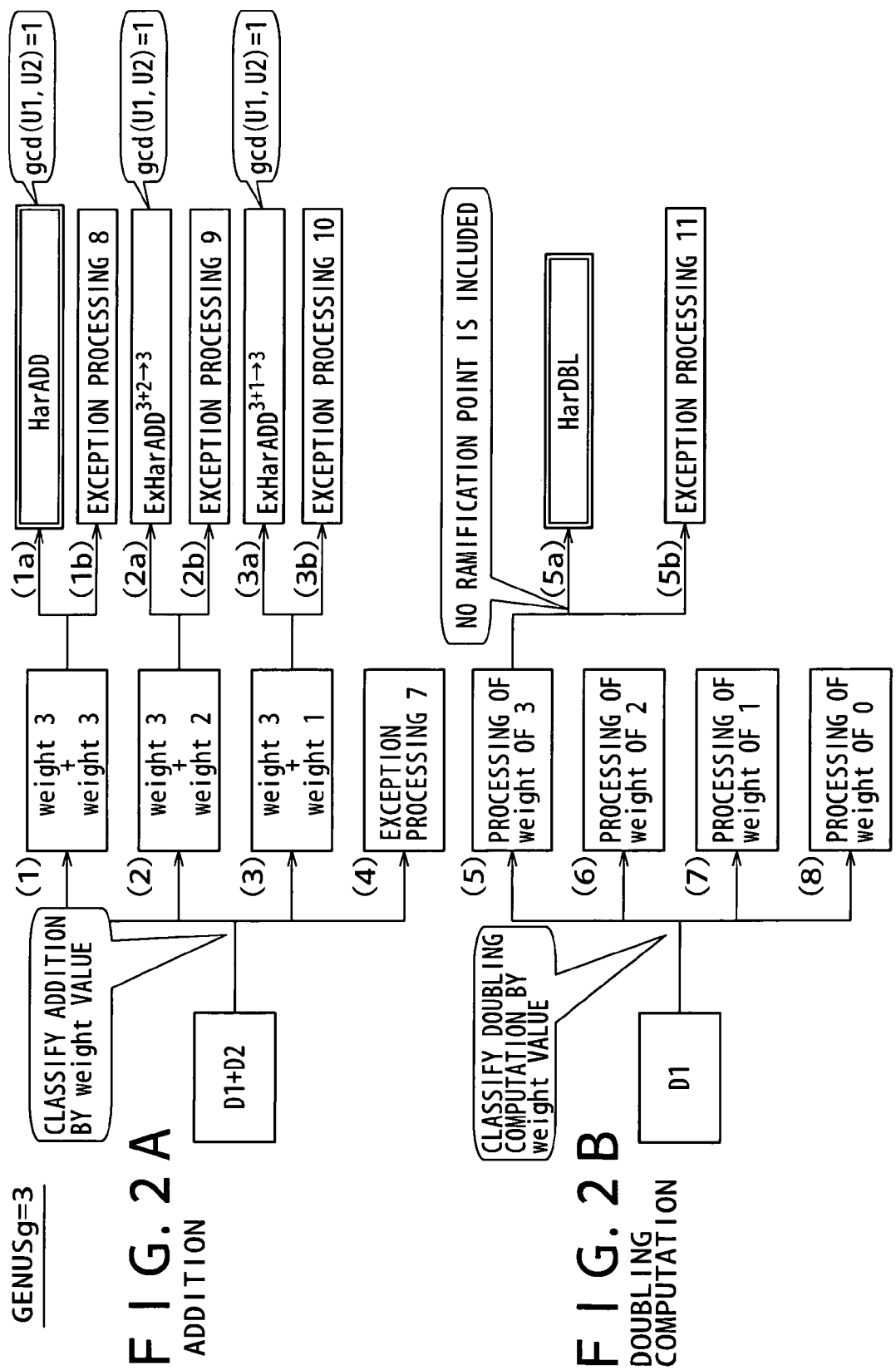
FIGS. 2A and 2B are explanatory diagrams referred to in explaining algorithms of addition and doubling computation in scalar multiplication processing of hyperelliptic curve cryptography for a hyperelliptic curve having a genus of 3.

A cryptography-processing apparatus provided by the present invention, a cryptography-processing method adopted by the cryptography-processing apparatus and a computer program implementing the cryptography-processing method are described in detail in paragraphs arranged as follows.

1: Outline of the Invention
2: Base-point Generation Algorithm
3: Processing Details
4: Functional Configuration of the Cryptography-Processing Apparatus
5: Typical Applications of the Invention to an Algorithm for Generating and Authenticating a Digital Signature
6: Typical Hardware Configuration of the Cryptography-Processing Apparatus 1: Outline of the Invention As described above, research on a method for increasing the processing speed of an HECC (hyperelliptic curve cryptography) method for generalizing elliptic curve cryptography is conducted widely. A hyperelliptic curve is a curve characterized by a genus g. Let notation q denote the number of elements in the definition body. In this case, the element count q is equal to $p^n$ ($q=p^n$) where notation p denotes a prime number and notation n denotes a positive integer. A hyperelliptic curve C defined over the finite field $F_q$ as a curve of the genus g is expressed by the following equation:

$$y^2 + h(x)y = f(x)$$

where $h(x)$, $f(x) \in F_q[x]$ and $f(x)$ is a monic polynomial of an order of $2g+1$.

A point −P opposite to a point P (P=(x, y)) on the hyperelliptic curve C is defined as (x, y+h(x)). A point for which P=−P is referred to as a ramification point.

As is commonly known, given safety equivalent to that of the elliptic curve cryptography, the processing size (or the number of bits) of a definition body of the hyperelliptic curve cryptography can be reduced to 1/g times the processing size of a definition body of an elliptic curve cryptography. A small processing size provides an implementation merit, which is one of advantages offered by the hyperelliptic curve cryptography.

As described above, a problem of finding k from $D_2$ can be treated as a discrete logarithmic problem in a Jacobian variety on the hyperelliptic curve. It is possible to treat the problem as a problem in a public-key cryptography where $D_2$ is a divisor defined as a scalar multiplication $kD_1$, k is a multiplier in the scalar multiplication $kD_1$ and $D_1$ is a divisor equal to a linear sum of points in the hyperelliptic curve cryptography.

In this case, a divisor is expressed by the following equation:

$$D = \sum_i m_i P_i - \left(\sum_i m_i\right) P_\infty, \quad m_i \geq 0 \quad \text{Equation 12}$$

However, for $P_i=(x_i, y_i)$ and $i \neq j$, a relation $P_i \neq P_j$ holds true. The divisor expressed in this format is referred to as a semi reduced divisor. In addition, $\Sigma m_i$ in the above equation is referred to as the weight of the divisor D. A semi reduced divisor having a weight not exceeding the genus is referred to as a reduced divisor.

In terms of polynomials U and V where U, V∈$F_q$[x], any semi reduced devisor D in a Jacobian variety on the hyperelliptic curve can be expressed as D=(U, V). This expression is referred to as a Mumford expression.

$U=\pi(x-x_i)^{m_i}$ $V(x_i)=y_1$ $V(x)^2+V(x)h(x)-f(x) \equiv 0 \bmod U(x), \deg V < \deg U$     Equation 13

By using the Mumford expression, any reduced divisor D for a genus of 2 can be expressed by a set of polynomials each having elements of the finite field set in coefficients of the polynomial and having an order not exceeding 2. That is to say, the reduced divisor can be expressed by the following equation:

$(U, V)=(x^2+u_1x+u_0, v_1x+v_0)$

In addition, by using the Mumford expression, any reduced divisor D for a genus of 3 can be expressed by a set of polynomials each having elements of the finite field set in coefficients of the polynomial and having an order not exceeding 3. That is to say, the reduced divisor can be expressed by the following equation:

$(U, V)=(x^3+u_2x^2+u_1x+u_0, v_2x^2+v_1x+v_0)$

It is to be noted that other expressions of a divisor include a modified Mumford expression and a weighted-coordinate expression. The modified Mumford expression corresponds to projective coordinates in the ECC (elliptic curve cryptography) and expresses the divisor as (U, V, Z), which is obtained by multiplying the Mumford expression (U, V) by a constant Z.

By the same token, the weighted-coordinate expression expresses the divisor as (U, V, Z1, Z2), which is obtained by multiplying the Mumford expression (U, V) by a plurality of constant Z1 and Z2. Both the modified Mumford expression and the weighted-coordinate expression are each used as a technique for reducing the amount of computation of a Harley algorithm described below.

As described before, when the scalar computation is applied to a cryptography technology, divisors $D_0$ necessary for the input are divided into the following two types:

(1): a divisor determined in advance; and
(2): a divisor undeterminable in advance and generated at random.

If a divisor of type (1) is applied, that is, if a divisor determined in advance is applied, the input divisor is used as a base point.

It is to be noted that, in the following description, the technical term "divisor D" used in this specification is a reduced divisor unless otherwise specified. As described above, a reduced divisor is a semi reduced divisor having a weight not exceeding the genus g.

As described before, an algorithm for generating an ordinary base point is executed by carrying out the following pieces of processing:

(a): g elements on a definition body $F_q$ are selected at random and g points $P_i$ (where i=1, - - - , g) on a hyperelliptic curve are generated.

(a1): The elements selected at random are used as x coordinates $x_i$ (where i=1, - - - , g). Then, such y coordinates are determined for the x coordinates that every point (x, y) is positioned on the hyperelliptic curve.

(b): Let the divisor of the base point be expressed as follows:

$D_0=(U(x), V(x))$ (b1): $U(x)=(x-x_1)(x-x_2) \text{ - - - } (x-x_g)$ (b2): Coefficients $v_i$ of an equation V $(x)=v_{g-1}x^{g-1}+v_{g-2}x^{g-2}+ \text{ - - - } +v_0$ are determined. If the generated points are all different from each other, for example, the coefficients $v_i$ can be found from an equation V $(x_i)=y_i$.

(c): The divisors generated in accordance with the above algorithm are each a divisor with a weight equal to the genus g.

In this way, the conventional algorithm and the conventional apparatus for generating a base point on a hyperelliptic curve with a genus of g generate a divisor with a weight equal to the genus g.

In the present invention, on a hyperelliptic curve with a genus of g, a divisor with a weight $g_0$ smaller than the genus g of the hyperelliptic curve is generated and used as a base point.

That is to say, a base point on a hyperelliptic curve with a genus of g is set at a divisor with a weight equal to a genus $g_0$ satisfying the following relation:

$g_0 < g$

By setting the base point at such a divisor, the scalar multiplication of the hyperelliptic curve cryptography can be carried out at a high speed.

2: Base-Point Generation Algorithm

The following description explains an algorithm for generating a divisor to be used as a base point on a hyperelliptic curve as a divisor with a weight $g_0$ smaller than the genus g of the hyperelliptic curve.

In the conventional algorithm for generating a divisor to be used as a base point on a hyperelliptic curve as a divisor with a weight equal to the genus g of the hyperelliptic curve, processing to select g points on the hyperelliptic curve is carried out. In the algorithm provided by the present invention as an algorithm for generating a base point, on the other hand, processing to select $g_0$ points on the hyperelliptic curve is carried out where $g_0$ and $g$ satisfy the following relation $1 \leq g_0 < g$.

Figure 3:
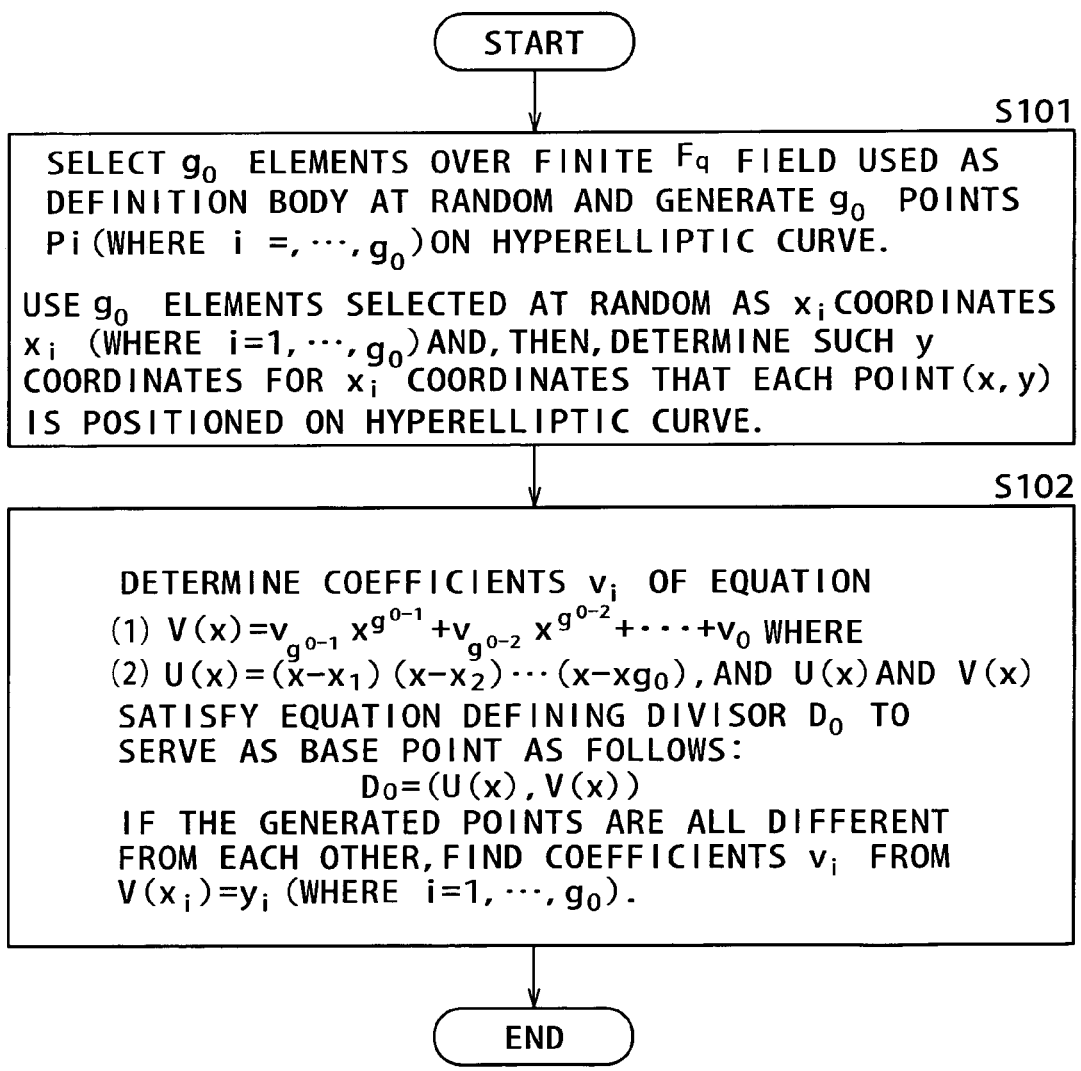
FIG. 3 shows a flowchart referred to in explaining a procedure of processing to set a base point in a computation process of the hyperelliptic curve cryptography provided by the present invention.

The algorithm provided by the present invention as an algorithm for generating a base point is explained by referring to FIG. 3. A process to generate a base point in accordance with the present invention is carried out by execution of the following processing procedure.

Step S101

$g_0$ elements are selected over a finite field $F_q$ used as a definition body at random and $g_0$ points $P_i$ (where $i=1, \text{---}, g_0$) are generated on a hyperelliptic curve.

(1): The $g_0$ elements selected at random are used as x coordinates $x_i$ (where $i=1, \text{---}, g_0$) and, then, such y coordinates are determined for the $x_i$ coordinates that each point (x, y) is positioned on the hyperelliptic curve.

Step S102

Coefficients $v_i$ of an equation $$V(x) = v_{g-1} x^{g-1} + v_{g-2} x^{g-2} + \text{---} + v_0 \quad (1)$$

are determined where $$U(x) = (x - x_1)(x - x_2) \text{---} (x - x_{g0}) \quad (2)$$

and $U(x)$ and $V(x)$ satisfy an equation defining the divisor $D_0$ to serve as the base point as follows:

$$D_0 = (U(x), V(x))$$

If the generated points are all different from each other, the coefficients $v_i$ are found from $V(x_i) = y_i$ (where $i=1, \text{---}, g_0$).

By execution of the above computation-processing steps, on a hyperelliptic curve with a genus of g, a divisor with a weight $g_0$ smaller than the genus g of the hyperelliptic curve can be generated to be used as a base point.

In the case of a hyperelliptic curve with a genus g of 3, for example, in accordance with the conventional technique for generating a base point, a divisor with a weight of 3 is used as the base point. With the algorithm provided by the present invention as an algorithm for setting a base point, on the other hand, a divisor with a weight of 1 or 2, which is smaller than the genus of 3, is used as the base point.

In addition, in the case of a hyperelliptic curve with a genus g of 2, for example, in accordance with the conventional technique for generating a base point, a divisor with a weight of 2 is used as the base point. With the algorithm provided by the present invention as an algorithm for setting a base point, on the other hand, a divisor with a weight of 1 smaller than the genus of 2 is used as the base point.

3: Processing Details

On a hyperelliptic curve with a genus of g, a divisor with a weight $g_0$ smaller than the genus g of the hyperelliptic curve can be generated to be used as a base point by application of the algorithm explained above by referring to FIG. 3. An addition formula used in a scalar-multiplication execution algorithm of scalar multiplication applying this divisor is different from an addition formula for scalar multiplication applying a base point having a weight equal to the conventional genus.

That is to say, if a divisor with a weight $g_0$ smaller than the genus g of the hyperelliptic curve is selected as a base point, an addition carried out in the scalar multiplication is no longer HarleyADD. Instead, the addition is an addition of "a divisor with a weight equal to the genus g+a divisor with a weight smaller than the genus g." Since the order of a polynomial expressing the divisor decreases, the computation cost of the addition of "a divisor with a weight equal to the genus g+a divisor with a weight smaller than the genus g" is a computation amount smaller than that of HarleyADD. Thus, the processing time of the scalar multiplication can be shortened.

Figure 4:
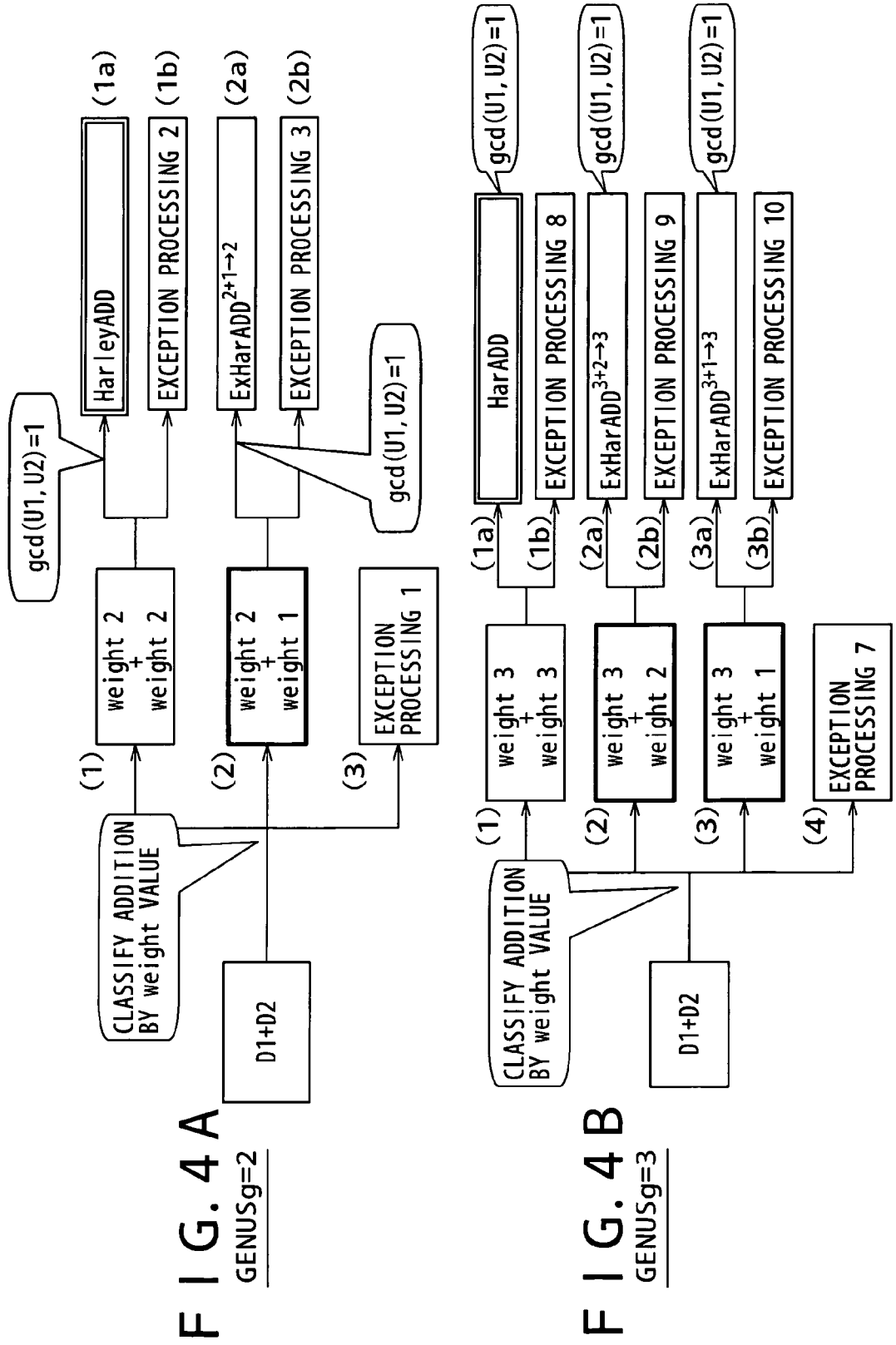
FIGS. 4A and 4B are explanatory diagrams referred to in explaining algorithms of addition in scalar multiplication processing of the hyperelliptic curve cryptography provided by the present invention.

By referring to FIGS. 4A and 4B, the following description explains addition processing in the scalar multiplication, for which a divisor with a weight $g_0$ smaller than the genus g of the hyperelliptic curve is selected as a base point. FIG. 4A is an explanatory diagram showing addition processing for a genus of 2. On the other hand, FIG. 4B is an explanatory diagram showing addition processing for a genus of 3.

In the addition processing shown in FIG. 4A as the conventional addition processing for a genus of 2, the base point is normally a divisor with a weight of 2. In this case, in accordance with the addition algorithm shown in FIG. 4A, the following addition processing is carried out:

(1): addition of a divisor with a weight of 2 to a divisor with a weight of 2, that is, addition of weights of 2. In this case, if the greatest common denominator gcd $(U_1, U_2)$ for the two divisors $D_1=(U_1, V_1)$ and $D_2=(U_2, V_2)$ is 1 or if gcd $(U_1, U_2)=1$, the addition processing is carried out in accordance with HarleyADD shown in the figure as process (1a), which is referred to as a most frequent case. That is to say, in many cases, the addition processing according to this algorithm, that is, HarleyADD (1a), is carried out.

If a divisor with a weight smaller than the genus g of the hyperelliptic curve is selected in accordance with the base-point selection algorithm explained earlier by referring to FIG. 3, however, processing is carried out to add a divisor with a weight equal to the genus g of the hyperelliptic curve to a divisor with a weight smaller than the genus g of the hyperelliptic curve. That is to say, addition of a weight of 2 to a weight of 1 shown in FIG. 4A as processing (2) is carried out. In this processing, the gcd $(U_1, U_2)$ is checked to determine whether or not the equation gcd $(U_1, U_2)=1$ holds true. If the equation gcd $(U_1, U_2)=1$ holds true, ExHarADD$^{2+1 \to 2}$ shown in the figure as processing (2a) is carried out. If the equation gcd $(U_1, U_2)=1$ does not hold true, on the other hand, exception processing 3 shown in the figure as processing (2b) is carried out.

In many cases, the equation gcd $(U_1, U_2)=1$ holds true. Thus, ExHarADD$^{2+1 \to 2}$ shown in the figure as processing (2a) is carried out. Since the order of a polynomial expressing the divisor decreases, the computation cost of the addition of "a divisor with a weight equal to the genus g+a divisor with a weight smaller than g" is a computation amount smaller than that of HarleyADD. Thus, the processing time of the scalar multiplication can be shortened.

In the addition processing shown in FIG. 4B as the conventional addition processing for a genus of 3, the base point is normally a divisor with a weight of 3. In this case, in accordance with the addition algorithm shown in FIG. 4B, the following addition processing is carried out:

(1): addition of a divisor with a weight of 3 to a divisor with a weight of 3, that is, addition of weights of 3. In this case, if the greatest common denominator gcd $(U_1, U_2)$ for the two divisors $D_1=(U_1, V_1)$ and $D_2=(U_2, V_2)$ is 1 or if gcd $(U_1, U_2)=1$, the addition processing is carried out in accordance with HarleyADD shown in the figure as process (1a), which is referred to as a most frequent case. That is to say, in many cases, the addition processing according to this algorithm, that is, HarleyADD (1a), is carried out.

If a divisor with a weight smaller than the genus g of the hyperelliptic curve is selected in accordance with the base-point selection algorithm explained earlier by referring to FIG. 3, however, processing is carried out to add a divisor with a weight equal to the genus g of the hyperelliptic curve to a divisor with a weight smaller than the genus g of the hyperelliptic curve. That is to say, addition of a weight of 3 to a weight of 2 shown in FIG. 4B as processing (2) or addition of a weight of 3 to a weight of 1 shown in FIG. 4B as processing (3) is carried out. Also in these pieces of processing, the gcd $(U_1, U_2)$ is checked to determine whether or not the equation gcd $(U_1, U_2)=1$ holds true. If the equation gcd $(U_1, U_2)=1$ holds true, ExHarADD$^{3+2 \rightarrow 3}$ shown in the figure as processing (2a) or ExHarADD$^{3+1 \rightarrow 3}$ shown in the figure as processing (3a) is carried out. If the equation gcd $(U_1, U_2)=1$ does not hold true, on the other hand, exception processing 9 shown in the figure as processing (2b) or exception processing 10 shown in the figure as processing (3b) is carried out.

In many cases, the equation gcd $(U_1, U_2)=1$ holds true. Thus, ExHarADD$^{3+2 \rightarrow 3}$ shown in the figure as processing (2a) or ExHarADD$^{3+1 \rightarrow 3}$ shown in the figure as processing (3a) is carried out. Since the order of a polynomial expressing the divisor decreases, the computation cost of the addition of "a divisor with a weight equal to the genus g+a divisor with a weight smaller than g" is a computation amount smaller than that of HarleyADD. Thus, the processing time of the scalar multiplication can be shortened.

Next, the processing of the scalar multiplication according to the present invention is explained by taking the cases of the hyperelliptic curve cryptographies with genuses of 2 and 3 as examples. The hyperelliptic curve cryptographies with genuses of 2 and 3 are popular research subjects and frequently disclosed in theses.

In the case of a hyperelliptic curve with a genus g of 2, scalar multiplication is carried out by selecting a divisor with a weight smaller than the genus g as a base point. That is to say, a divisor with a weight of 1 is selected as a base point. The scalar multiplication adopting the binary technique or the double-and-add-always technique is shown below.

(1): A genus of 2, a binary technique and a base point with a weight of 1

```
Input D_0
Output D = dD_0
D ← D_0       //Divisor with a weight of 1
for i from l - 2 to 0
  {
    D ← 2D     //Harley DBL doubling computation
    if d_i = 1 then D ← D + D_0   //Addition of a weight of 1 to a weight
                                    of 2
  }
return D
```
Equation 14

(2): A genus of 2, a double-and-add-always technique and a base point with a weight of 1

```
Input D_0
Output D = dD_0
D[0] ← D_0      //Divisor with a weight of 1
for i from l - 2 to 0
  {
    D[0] ← 2D[0]       //Harley DBL doubling computation
    D[1] ← D[0] + D_0  //Addition of a weight of 1 to a weight of 2
    D[0] ← D[d_i]
  }
return D[0]
```
Equation 15

In either case, in accordance with the conventional technique, HarleyADD is carried out. By taking a divisor with a weight of 1 as a base point, the addition processing can be replaced with the processing of a weight of 1+a weight of 2 shown in FIG. 4A as processing 2. The processing of a weight of 1+a weight of 2 is carried out differently in dependence on whether or not the divisor of the weight of 1 and the divisor of the weight of 2 have a common point.

That is to say, if the greatest common denominator gcd $(U_1, U_2)$ for the two divisors $D_1=(U_1, V_1)$ and $D_2=(U_2, V_2)$ is 1 or if gcd $(U_1, U_2)=1$, the divisors do not include either a common point or points opposite to each other. In this case, ExHarADD$^{2+1 \rightarrow 2}$ shown in the figure as processing (2a) is carried out. If the equation gcd $(U_1, U_2)=1$ does not hold true, on the other hand, exception processing 3 shown in the figure as processing (2b) is carried out.

Much like HarleyADD referred to as a most frequency case, in many cases, the greatest common denominator gcd $(U_1, U_2)$ for the two divisors $D_1=(U_1, V_1)$ and $D_2=(U_2, V_2)$ is 1. Thus, ExHarADD$^{2+1 \rightarrow 2}$ shown in the figure as processing (2a) is carried out at a high probability.

The computation process of ExHarADD$^{2+1 \rightarrow 2}$ is shown in Table 3 as follows.

TABLE 3

| ExHarADD$^{2+1 \rightarrow 2}$ | | |
|---|---|---|
| Input: $D_1 = (u_1, v_1)$, deg $u_1 = 1$, $D_2 = (u_2, v_2)$, deg $u_2 = 2$ | | |
| Output: $D_3 = (u_3, v_3) = D_1 + D_2$ | | |
| 1 | Compute $r = u_2 \bmod u_1$ | 1M |
|   | $r \leftarrow u_{20} + (u_{21} + u_{10})u_{10}$. | |
| 2 | Compute inverse of $u_2 \bmod u_1$: | 1I |
|   | inv $\leftarrow 1/r$. | |
| 3 | Compute $s_0 = \text{inv}(v_1 + v_2) \bmod u_1$: | 2M |
|   | $s_0 \leftarrow \text{inv}(v_{10} + v_{20} + v_{21}u_{10})$. | |
| 4 | Compute $l = s \cdot u_2 = s_0 x^2 + l_1 x + l_0$: | 2M |
|   | $l_1 \leftarrow s_0 u_{21}, l_0 \leftarrow s_0 u_{20}$. | |
| 5 | Compute $k =$ | 1M |
|   | $(f + v_2 h + v_2^2)/u_2 = x^3 + k_2 x^2 + k_1 x + k_0$: | |
|   | $k_2 \leftarrow f_4 + u_{21}, k_1 \leftarrow f_3 + (f_4 + u_{21})u_{21} + v_{21} + u_{20}$. | |
| 6 | Compute $u_3 = (k + s(l + h))/u_1 = x^2 + u_{31}x + u_{30}$: | 3M |
|   | $u_{31} \leftarrow k_2 + s_0^2 + s_0 + u_{10}$, | |
|   | $u_{30} \leftarrow k_1 + s_0(l_1 + h_1) + u_{10}u_{31}$. | |
| 7 | Compute $v_3 = v_{31}x + v_{30} \equiv (l + v_2) + h \bmod u_3$: | 2M |
|   | $v_{31} \leftarrow u_{31}(h_2 + s_0) + (h_1 + l_1 + v_{21})$, | |
|   | $v_{30} \leftarrow u_{30}(h_2 + s_0) + (h_0 + l_0 + v_{20})$. | |
| total | ExHarADD$^{2+1 \rightarrow 2}$ | 1I + 11M |

Equation 16

In the case of a characteristic of 2, as shown in table 3, the amount of the computation of ExHarADD$^{2+1 \rightarrow 2}$ is the sum of 1 inversion and 11 multiplications or represented by an expression of 1I+11M where notations M denote an inversion and a multiplication, respectively.

The computation processing of HarleyADD is shown in Table 1 as follows:

TABLE 1

HarleyADD(genus 2)

Input: $D_1 = (u_1, v_1)$, deg $u_1 = 2$, $D_2 = (u_2, v_2)$, deg $u_2 = 2$
Output: $D_3 = (u_3, v_3) = D_1 + D_2$

| | | |
|---|---|---|
| 1 | Compute $r = \text{res}(u_1, u_2)$: | 4M |
| | $w_1 \leftarrow u_{11} + u_{21}$, $w_0 \leftarrow u_{21}w_1 + u_{10} + u_{20}$, $r \leftarrow (u_{10} + u_{20})w_0 + u_{20}w_1^2$; | |
| 2 | Compute $I = i_1 x + i_0 \equiv r u_1^{-1} \bmod u_2$ | |
| | $i_1 \leftarrow w_1$, $i_0 \leftarrow w_0$; | |
| 3 | Compute $T = t_1 x + t_0 \equiv (v_1 + v_2)I \bmod u_2$: | 5M |
| | $t_2 \leftarrow (v_{11} + v_{21})w_1$, $t_0 \leftarrow (v_{10} + v_{20})w_0$, | |
| | $t_1 \leftarrow (v_{11} + v_{21} + v_{10} + v_{20})(w_0 + w_1) + t_2 + t_0$, | |
| | $t_1 \leftarrow t_1 + t_2 u_{21}$, $t_0 \leftarrow t_0 + t_2 u_{20}$; | |
| 4 | If $t_1 = 0$ then call sub-procedure. | |
| 5 | Compute $S = s_1 x + s_0$: | 1I + 6M |
| | $w_2 \leftarrow (rt_1)^{-1}$, $w_3 \leftarrow w_2 r$, $w_4 \leftarrow w_2 t_1$, $w_5 \leftarrow w_3 r$, $s_1 \leftarrow w_4 t_1$, $s_0 \leftarrow w_4 t_0$; | |
| 6 | Compute $u_3 = x^2 + u_{31} x + u_{30} = S_1^{-2}(f + h(Su_1 + v_1) + (Su_1 + v_1)^2)/u_1 u_2$: | 5M |
| | $u_{31} \leftarrow w_1 + w_5(1 + w_5)$, $u_{30} \leftarrow u_{21} w_1 + u_{10} + u_{20} + w_5(s_0 + s_0^2 + w1)$; | |
| 7 | Compute $v_3 = v_{31} x + v_{30} \equiv Su_1 + v_1 + h \bmod u_3$: | 5M |
| | $w_1 \leftarrow u_{11} + u_{31}$, $w_0 \leftarrow u_{10} + u_{30}$, $w_2 \leftarrow s_1 w_1$, $w_3 \leftarrow s_0 w_0$, | |
| | $w_4 \leftarrow (s_1 + s_0)(w_1 + w_0) + w_2 + w_3$, $w_2 \leftarrow w_2 + 1$, $w_1 \leftarrow w_4 + w_2 u_{31}$, | |
| | $w_0 \leftarrow w_3 + w_2 u_{30}$, $v_{31} \leftarrow w_1 + v_{11} + h_1$, $v_{30} \leftarrow w_0 + v_{10} + h_0$; | |
| total | HarleyADD | 1I + 25M |

Equation 17

As shown in table 1, the amount of the computation of HarleyADD is the sum of 1 inversion and 25 multiplications or represented by an expression of 1I+25M where notations I and M denote an inversion and a multiplication, respectively.

As is obvious from the above data, the amount of the computation of ExHarADD$^{2+1 \to 2}$ can be made smaller than the amount of the computation of HarleyADD. That is to say, if scalar multiplication processing is carried out by selecting a divisor with a weight smaller than the genus g of the hyperelliptic curve, ExHarADD$^{2+1 \to 2}$ with a small amount of computation is carried out in place of HarleyADD so that the scalar multiplication processing can be carried out at a high speed. The amount of computation can be reduced as well for a case in which the definition body is not the two extension fields.

A concrete example is explained as follows. In the case of a genus of 2 and a definition body of $F_2^{83}$, scalar multiplication processing adopting the binary technique or the double-and-add-always technique has been estimated to have a high speed to process every bit in comparison with the conventional technique.

A processing reduction rate per bit for the binary technique is represented by the following expression:

{½(HarleyADD computation amount−
ExHarADD$^{2+1 \to 2}$computation amount)}/{½HarleyADD computation amount+HarleyDBL computation amount}

A processing reduction rate per bit for the double-and-add-always technique is represented by the following expression:

(HarleyADD computation amount−
ExHarADD$^{2+1 \to 2}$computation amount)/(HarleyADD computation amount+HarleyDBL computation amount)

A processing reduction rate can be found by substituting I+11M, I+25M and I+27M respectively for the ExHarADD$^{2+1 \to 2}$ computation amount, the HarleyADD computation amount and the HarleyDBL computation amount in the expressions of the above processing reduction rates per bit.

As a result, it is obvious that, by setting a divisor with a weight of $g_0$ smaller than the genus g of the hyperelliptic curve as a base point in a base-point-setting processing provided by the present invention, the binary technique and the double-and-add-always technique are capable of increasing the processing speed by 15.3% and 23.3% respectively over the conventional technique whereby a divisor with a weight of $g_0$ equal to the genus g of the hyperelliptic curve is set as a base point. It is assumed in this case, however, that an equation I=4.1M holds true where notation M denotes a multiplication process over the finite field and notation I denotes a division process to find the inverse element of a quantity.

In the case of a genus of 3, it is possible to adopt a method of using a divisor with a weight of 1 as a base point and a method of using a divisor with a weight of 2 as a base point. Much like the case of a genus of 2, in the calculation processing adopting the binary technique or the double-and-add-always technique, HarleyADD carried out to add a divisor with a weight equal to the genus g of 3 to another divisor also having a weight equal to the genus g of 3 can be replaced with the addition of a weight of 1 to a weight of 3 or the addition of a weight of 2 to a weight of 3.

In the case of a genus of 3, algorithms of the binary technique and the double-and-add-always technique adopted in scalar multiplication processing are given below.

(1): A genus of 3, the binary technique and a base point with a weight of 1

```
Input D_0
Output D = dD_0
D ← D_0         //Divisor with a weight of 1
for i from l - 2 to 0
{
    D ← 2D      //Harley DBL doubling computation
    if d_i = 1 then D ← D + D_0     //Addition of a weight of 1 to a weight
                                     of 3
}
return D
```

Equation 18

(2): A genus of 3, a double-and-add-always technique and a base point with a weight of 1

---
Input $D_0$
Output $D = dD_0$
$D[0] \leftarrow D_0$     //Divisor with a weight of 1
for i from l - 2 to 0
{
  $D[0] \leftarrow 2D[0]$     //Harley DBL doubling computation
  $D[1] \leftarrow D[0] + D_0$     //Addition of a weight of 1 to a weight of 3
  $D[0] \leftarrow D[d_i]$
}
return $D[0]$ Equation 19

---

(3): A genus of 3, the binary technique and a base point with a weight of 2

---
Input $D_0$
Output $D = dD_0$
$D \leftarrow D_0$     //Divisor with a weight of 2
for i from l - 2 to 0
{
  $D \leftarrow 2D$     //Harley DBL doubling computation
  if $d_i = 1$ then $D \leftarrow D + D_0$     //Addition of a weight of 2 to a weight of 3
}
return $D$ Equation 20

---

(4): A genus of 3, a double-and-add-always technique and a base point with a weight of 2

---
Input $D_0$
Output $D = dD_0$
$D[0] \leftarrow D_0$     //Divisor with a weight of 2
for i from l - 2 to 0
{
  $D[0] \leftarrow 2D[0]$     //Harley DBL doubling computation
  $D[1] \leftarrow D[0] + D_0$     //Addition of a weight of 2 to a weight of 3
  $D[0] \leftarrow D[d_i]$
}
return $D[0]$ Equation 21

---

As described above, much like the case of a genus of 2, in computation processing adopting the binary technique and the double-and-add-always technique, HarleyADD actually carried out in an addition of a divisor with a weight equal to the genus of 3 to a divisor with the same weight is replaced with the addition of a weight of 1+a weight of 3 or the addition of a weight of 2+a weight of 3. As shown in FIG. 4B, the addition of a weight of 1+a weight of 3 and the addition of a weight of 2+a weight of 3 are carried out carried out in a way dependent on whether or not the divisors have a common point.

That is to say, if the greatest common denominator gcd($U_1$, $U_2$) for the two divisors $D_1=(U_1, V_1)$ and $D_2=(U_2, V_2)$ is 1 or if gcd($U_1, U_2$)=1, the divisors do not include either a common point or points opposite to each other. In this case, ExHarADD$^{3+2 \rightarrow 3}$ shown in the figure as processing (2a) or ExHarADD$^{3+1 \rightarrow 3}$ shown in the figure as processing (3a) is carried out for the addition of a weight of 2+a weight of 3 or the addition of a weight of 1+a weight of 3, respectively. If the equation gcd($U_1, U_2$)=1 does not hold true, on the other hand, exception processing 9 shown in the figure as processing (2b) or exception processing 10 shown in the figure as processing (3b) is carried out for the addition of a weight of 2+a weight of 3 or the addition of a weight of 1+a weight of 3, respectively.

Much like HarleyADD referred to as a most frequency case, in many cases, the greatest common denominator gcd ($U_1$, $U_2$) for the two divisors $D_1=(U_1, V_1)$ and $D_2=(U_2, V_2)$ is 1. Thus, ExHarADD$^{3+2 \rightarrow 3}$ shown in the figure as processing (2a) or ExHarADD$^{3+1 \rightarrow 3}$ shown in the figure as processing (3a) is carried out for the addition of a weight of 2+a weight of 3 or the addition of a weight of 1+a weight of 3, respectively.

Since ExHarADD$^{3+2 \rightarrow 3}$ and ExHarADD$^{3+1 \rightarrow 3}$ each have a small amount of computation in comparison with HarleyADD, the speed of the entire scalar multiplication processing can be increased. Since the amount of computation of each of ExHarADD$^{3+2 \rightarrow 3}$ and ExHarADD$^{3+1 \rightarrow 3}$ is not disclosed in any thesis or another document explicitly, the amount of computation for each of them has been estimated originally as follows.

A computation process of ExHarADD$^{3+1 \rightarrow 3}$ is shown in table 6 as follows.

TABLE 6

ExHarADD$^{3+1 \rightarrow 3}$

Input: $D_1 = (u_1, v_1)$, deg $u_1 = 3$, $D_2 = (u_2, v_2)$, deg $u_2 = 1$
Output: $D_3 = (u_3, v_3) = D_1 + D_2$

| | | |
|---|---|---|
| 1 | Compute $r = \text{res}(u_1, u_2)$: | 3M |
| | $w_0 \leftarrow u_{20}^2$, $w_1 \leftarrow w_0(u + 12 + u_{20})$, $w_2 \leftarrow u_{20}u_{11}$, $r \leftarrow w_1 + w_2 + u_{10}$. | |
| 2 | Compute inverse of $u_1$ mod $u_2$: | 1I |
| | inv $\leftarrow 1/r$. | |
| 3 | Compute $s_0 = \text{inv}(v_1 + v_2)$ mod $u_2$: | 3M |
| | $z_0 \leftarrow w_0 v_{12}$, $s_0 \leftarrow \text{inv}(v_{10} + v_{20} + u_{20}v_{11} + z_0)$. | |
| 4 | Compute $u_3 = (f + hv + v^2)/(u_1 u_2)$, $v = s_0 u_1 + v_1$: | 12M |
| | $u_{32} \leftarrow s_0^2 + s_0 + u_{20} + u_{12} + f_6$ | |
| | $t_0 \leftarrow f_6 + s_0^2 + u_{12}$, $t_1 \leftarrow u_{12}t_0$, $t_2 \leftarrow u_{20}u_{32}$, $t_3 \leftarrow h_2 s_0$, | |
| | $u_{31} \leftarrow t_1 + t_2 + t_3 + u_{11} + v_{12} + f_5$, | |
| | $t_4 \leftarrow u_{20}(t_8 + v_{12} + f_6 + t_3 + u_{11})$, $t_5 \leftarrow v_{12}(v_{12} + u_{12} + h_2)$, | |
| | $t_6 \leftarrow u_{12}(u_{12}(f_6 + u_{12}) + f_5)$, | |
| | $u_{30} \leftarrow w_0 u_{32} + t_4 + t_5 + u_{12}t_0 + s_0 h_1 + t_6 + u_{10} + f_4 + v_{11}$. | |

TABLE 6-continued

ExHarADD$^{3+1 \to 3}$

| | | |
|---|---|---|
| 5 | Compute $v_3 = v_{32}x^2 + v_{31}x + v_{30} \equiv s_0u_1 + v_1 + h \mod u_3$: <br> $v_{32} \leftarrow v_{12} + h_2 + s_0(u_{12} + u_{32}) + u_{32}$, <br> $v_{31} \leftarrow v_{11} + h_2 + s_0(u_{11} + u_{31}) + u_{31}$, <br> $v_{30} \leftarrow v_{10} + h_2 + s_0(u_{10} + u_{30}) + u_{30}$. | 3M |
| total | ExHarADD$^{3+1 \to 3}$ | 1I + 21M <br> Equation 22 |

As shown in table 6, the amount of the computation of ExHarADD$^{3+1 \to 3}$ is the sum of 1 inversion and 21 multiplications or represented by an expression of 1I+21M where notations I and M denote an inversion and a multiplication, respectively.

A computation process of ExHarADD$^{3+2 \to 3}$ is shown in table 7 as follows.

TABLE 7

ExHarADD$^{3+2 \to 3}$

Input: $D_1 = (u_1, v_1)$, deg $u_1 = 3$, $D_1 = (u_2, v_2)$, deg $u_2 = 2$
Output: $D_3 = (u_3, v_3) = D_1 + D_2$

| | | |
|---|---|---|
| 1 | Compute $r = res(u_1, u_2)$: <br> $w_0 \leftarrow u_{20}^2, w_1 \leftarrow u_{11}^2, w_2 \leftarrow u_{21}^2, w_3 \leftarrow u_{12} + u_{21}$, <br> $w_4 \leftarrow w_0 + (u_{20} + u_{12}w_3), w_5 \leftarrow u_{21}(u_{10} + u_{11}w_3), w_5 \leftarrow u_{20}(w_5 + w_1)$, <br> $w_6 \leftarrow w_3w_2 + u_{21}u_{11} + u_{10}(u_{10} + w_6), r \leftarrow w_4 + w_5 + w_6$ | 11M |
| 2 | Compute $ru_1^{-1} \mod u_2 \equiv i_1x + i_0$: <br> $i_2 \leftarrow u_{21}u_{12}, i_3 \leftarrow u_{21}u_{11}, i_4 \leftarrow u_{20}u_{12}$, <br> $i_1 \leftarrow i_2 + w_2 + u_{20} + u_{11}, i_0 \leftarrow w_2w_3 + i_3 + i_4 + u_{10}$ | 4M |
| 3 | Compute $t \equiv t_1x + t_0 \equiv r(v_1 + v_2)u_1^{-1} \mod u_2$: <br> $c_1 \leftarrow v_{11} + v_{21} + v_{12}u_{21}, c_0 \leftarrow v_{20} + v_{10} + v_{12}u_{20}$, <br> $t_2 \leftarrow i_1c_1, t_3 \leftarrow i_0c_0, t1 = t_2u_{21} + (i_1 + i_0)(c_1 + c_0) + t_2 + t_3$, <br> $t_0 \leftarrow t_3 + t_2u_{20}$. | 7M |
| 4 | Compute $s \equiv 1/r \equiv s_1x + s_0$: <br> $z_1 \leftarrow rt_1, z_2 \leftarrow 1/z_1, z_3 \leftarrow z_2r, z_4 \leftarrow z_2t_1, z_5 \leftarrow z_3r, s_1 \leftarrow z_4t_1, s_0 \leftarrow z_4t_0$. | 1I + 6M |
| 5 | Compute $v = su_1 + v_1 = s_1x^4 + k_3x^3 + k_2x^2 + k_1x + k_0$: <br> $t_0 \leftarrow s_0u_{12}, t_1 \leftarrow s_0u_{10}, t_2 \leftarrow s_1u_{11}$, <br> $k_3 \leftarrow (s_1 + s_0)(1 + u_{12}) + s_1 + t_0, k_2 \leftarrow t_0 + t_2 + v_{12}$, <br> $k_1 \leftarrow (s_1 + s_0)(u_{11} + u_{10}) + t_2 + t_1 + v_{11}, k_0 \leftarrow t_1 + v_{10}$. | 5M |
| 6 | Compute $u_3 + s_1^{-2}(f + hv + v^2)/(u_1u_2)$: <br> $u_{32} \leftarrow z_5(z_5 + 1) + u_{12} + u_{21}, t_0 \leftarrow k_3^2, t_1 \leftarrow u_{12}^2$, <br> $t_2 \leftarrow z_5(z_5(f_0 + u_{12} + u_{21} + t_0 + k_3) + u_{21} + h_2 + u_{12})$, <br> $u_{31} \leftarrow i_2 + u_{11} + u_{20} + t_1 + w_2 + t_2$, <br> $t_3 \leftarrow (t_1 + w_2)(u_{21} + u_{12}) + i_3 + i_4 + u_{10}$, <br> $t_4 \leftarrow i_2 + u_{20} + w_2 + u_{11} + t_1 + f_5 + (u_{21} + u_{12})(t_0 + f_6 + k_3) + k_2$, <br> $t_4 \leftarrow z_5(t_4 + k_3h_2) + h_2(u_{12} + u_{21}) + t_1 + w_2 + i_2 + u_{20} + u_{11} + h_1, t_4 \leftarrow z_5t_4$, <br> $u_{30} \leftarrow t_3 + t_4$. | 11M |
| 7 | Compute $v_3 = v_{32}x^2 + v_{31}x + v_{30} \equiv su_1 + v_1 + h \mod u_3$: <br> $t_0 \leftarrow s_0(u_{32} + u_{12}), t_1 \leftarrow s_1(u_{31} + u_{11}), t_2 \leftarrow s_1(u_{12} + u_{32})$, <br> $v_{32} \leftarrow t_0 + t_1 + t_2u_{32} + u_{32} + v_{12} + h_2$, <br> $t_4 \leftarrow s0(u_{30} + u_{10}), t_5 \leftarrow (s_1 + s_0)(u_{31} + u_{11} + u_{30} + u_{10})$, <br> $v_{31} \leftarrow t_5 + t_1 + t_4 + t_2u_{31} + u_{31} + v_{11} + h_1$, <br> $v_{30} \leftarrow t_4 + t_2u_{30} + u_{30} + v_{10} + h_0$. | 8M |
| total | ExHarADD$^{3+2 \to 3}$ | 1I + 52M <br> Equation 23 |

As shown in table 7, the amount of the computation of ExHarADD$^{3+2 \to 3}$ is the sum of 1 inversion and 52 multiplications or represented by an expression of 1I+52M where notations I and M denote an inversion and a multiplication, respectively.

The computation amounts of HarleyADD and HarleyDBL for a genus g of 3 are estimated in Non-Patent Document 10, namely, J. Pelzl, T. Wollinger, J Guajardo and C. Paar. hyperelliptic curve Cryptosystems: Closing the Performance Gap to Elliptic Curves. Cryptology eprint Archive, 2003/026, IACR, 2003. In order to determine whether or not the estimated amounts of computation are correct, a cryptography-processing apparatus has been actually implemented and the amounts of computation have been verified. Results of the verification indicate that the computation amounts of HarleyADD and HarleyDBL are I +78M and I+81M, respectively.

Thus, as will be described below, much like the case of a genus of 2, the reduction of the computation amounts and, hence, the enhancement of the processing speed can be expected. It is to be noted that the computation amounts of ExHarADD$^{3+2 \to 3}$, ExHarADD$^{3+1 \to 3}$ HarleyADD and HarleyDBL, which are described above, are all computation amounts for a characteristic of 2. Even for characteristics other than 2, however, the amounts of computation can also be reduced as well.

A concrete example is explained as follows. In the case of a genus of 3 and a definition body of $F_2^{63}$, scalar multiplication processing adopting the binary technique or the double-and-add-always technique has been estimated to have a high speed to process every bit in comparison with the conventional technique.

A processing reduction rate per bit for the binary technique is represented by the following expression:

{½(HarleyADD computation amount−
ExHarADD$^{3+1 \rightarrow 3}$computation amount or
ExHarADD$^{3+2 \rightarrow 3}$computation amount)}/{½HarleyADD computation amount+HarleyDBL computation amount}

In addition, a processing reduction rate per bit for the double-and-add-always technique is represented by the following expression:

(HarleyADD computation amount−
ExHarADD$^{3+1 \rightarrow 3}$computation amount or
ExHarADD$^{3+2 \rightarrow 3}$computation amount)/(HarleyADD computation amount+HarleyDBL computation amount)

A processing reduction rate can be found by substituting I+21M, I+52M, I+78M and I+81M respectively for the ExHarADD$^{3+1 \rightarrow 3}$ computation amount, the ExHarADD$^{3+2 \rightarrow 3}$ computation amount, the HarleyADD computation amount and the HarleyDBL computation amount in the expressions of the above processing reduction rates per bit.

As a result, by setting a divisor with a weight of 1 as a base point, the binary technique and the double-and-add-always technique are expected to be capable of increasing the processing speed by 22.0% and 33.2%, respectively. By setting a divisor with a weight of 2 as a base point, on the other hand, the binary technique and the double-and-add-always technique are expected to be capable of increasing the processing speed by 10.0% and 15.1%, respectively. It is assumed in this case, however, that an equation I=6.4M holds true for $F_2^{63}$ where notation M denotes a multiplication process over the finite field and notation I denotes a division process to find the inverse element of a quantity.

It is thus obvious that, by setting a divisor with a weight of $g_0$ smaller than the genus g of the hyperelliptic curve as a base point in base-point-setting processing provided by the present invention, both the binary technique and the double-and-add-always technique are capable of decreasing the amounts of computation and increasing the processing speeds from those of the conventional technique whereby a divisor with a weight of $g_0$ equal to the genus g of the hyperelliptic curve is set as a base point.

The descriptions given so far have explained methods to increase processing speeds by using any arbitrary divisor with a weight smaller than the genus g of the hyperelliptic curve as a base point. As described before, a divisor can be represented by a Mumford expression. If a divisor, for which at least one of coefficients of a polynomial representing the Mumford expression is 0 or 1, is selected among the divisors to serve as a base point, it is possible to reduce the number of multiplications in the base-point addition processing applying the following computations: ExHarADD$^{3+1 \rightarrow 3}$ shown in FIG. 4A as processing (2a) in an algorithm for a genus of 2 and ExHarADD$^{3+2 \rightarrow 3}$ or ExHarADD$^{3+1 \rightarrow 3}$ shown in FIG. 4B as processing (2a) or processing (3a) respectively in an algorithm for a genus of 3. Since the number of multiplications can be reduced, the processing speed can be further increased. In order to make the explanation simple, the case of g=2 is taken as an example.

In the case of g=2, the base point is a divisor with a weight of 1. By using the Mumford expression, a divisor $D_0$ can be expressed as follows.

1:
$$D_0=(U(x), V(x))$$

2:
$$U(x)=x+u_0, V(x)=v_0$$

3: $(u_0, v_0)$ is a set of coordinates of a point selected arbitrarily among points on a hyperelliptic curve C.

Assume for example that a point (0, y) exists on the hyperelliptic curve C where x and y coordinates are elements in the definition body $F_q$. If this point is used as the base point, the following equations hold true: $u_0=0$ and $v_0=y$. In this case, the HarADD$^{2+1 \rightarrow 2}$ computation process, which is the ExHarADD$^{2+1 \rightarrow 2}$ computation process shown earlier in table 3 representing Eq. 16, no longer requires implementations of the following multiplications over the finite field.

Table 3 Step 1 $(u_{21}+u_{10})u_{10}$ (Reduction of 1 M)
Table 3 Step 3 $v_{21} u_{10}$ (Reduction of 1 M)
Table 3 Step 6 $u_{10}u_{31}$ (Reduction of 1 M)

Thus, the amount of computation is reduced by 3 multiplications (3M) to I+8M from I+11M of the computation amount for the normal ExHarADD$^{2+1 \rightarrow 2}$ processing. As a result, the processing speed can be further improved.

In accordance with the descriptions given so far, as a method to increase the processing speed over those of the Harley algorithm and its improved version, a divisor with a weight smaller than the genus g of the hyperelliptic curve is used as a base point. In a configuration implemented with such a base point, the amount of computation in the addition processing can be reduced and, hence, the speed of the scalar multiplication processing can be increased as explained above. Also in accordance with another addition algorithm referred to as the Cantor algorithm, a divisor with a weight smaller than the genus g of the hyperelliptic curve is used as a base point to reduce the amount of computation in the addition processing and, hence, increase the speed of the scalar multiplication processing.

If the Cantor algorithm is used as an addition algorithm in the hyperelliptic curve cryptography (HECC) with a genus g, the amount of computation for addition of a divisor with a weight smaller than the genus g to a divisor with a weight equal to the genus g will be smaller than addition of divisors each having a weight equal to the genus g. Thus, in the addition algorithm for a genus g, by using a divisor with a weight smaller than the genus g as a base point, the processing speed can be increased in exactly the same way as the Harley algorithm.

Let notation HECC1 denote the safety of the hyperelliptic curve cryptography (HECC). In this case, the safety HECC1 is generally based on the complexity of the discrete logarithmic problem to find k from a base divisor D and an arbitrary divisor W (=kD). The discrete logarithmic problem to find k from a base divisor D and an arbitrary divisor W (=kD) is also referred to in the following description as discrete logarithmic problem 1. By the same token, let notation HECC2 denote the safety of the proposed hyperelliptic curve cryptography (HECC) taking a divisor $D_1$ with a weight smaller than the genus g of the hyperelliptic curve as a base divisor. In this case, the safety HECC2 is also based on the complexity of the discrete logarithmic problem to find k from the base divisor $D_1$ and an arbitrary divisor W1 (=k$D_1$). The discrete logarithmic problem to find k from a base divisor $D_1$ and an arbitrary divisor W1 (=k$D_1$) is also referred to in the following description as discrete logarithmic problem 2. The fact that the problems can be solved with ease by solving discrete logarithmic problems 1 and 2 twice can be shown with ease. That is to say, the safety HECC2 of the proposed hyperelliptic curve cryptography (HECC) taking a divisor $D_1$ with a weight smaller than the genus g of the hyperelliptic curve as a base divisor is equivalent to the safety HECC1 of the ordinary hyperelliptic curve cryptography (HECC).

As described above, in accordance with the present invention, by using a divisor with a weight smaller than the genus g of the hyperelliptic curve, the computation amount of addition processing can be reduced and, hence, the speed of the scalar multiplication processing can be raised so that the cryptography processing can be carried out at a high speed without losing the safety HECC of the ordinary hyperelliptic curve cryptography (HECC).

In the cryptography processing manipulating divisors on a hyperelliptic curve, the scalar multiplication of divisors is a heavy processing load. By increasing the speed of the scalar multiplication processing in accordance with the proposed techniques, however, the quality of the cryptography processing can be substantially improved.

As described above, the hyperelliptic curve cryptography (HECC) is a generalized concept of the elliptic curve cryptography (ECC). Thus, the present invention can be applied to processing using the elliptic curve cryptography (ECC), which is applied to a variety of fields. Concrete examples of the processing using the elliptic curve cryptography (ECC) are signature processing, generation of encrypted data, decryption processing, processing to share a cryptography key and authentication processing. By replacing the scalar multiplication portion of the computation processing of the elliptic curve cryptography (ECC) with the scalar multiplication described above, the speed of the processing can be increased.

In an algorithm using the elliptic curve cryptography (ECC), the scalar computation is classified into two large categories, namely, processing using a base point determined in advance and processing using a point selected at random. This classification is also applied to the hyperelliptic curve cryptography (HECC) as well. In accordance with the present invention, a divisor having a weight smaller than the genus g of a curve is selected to serve as a base point among all divisors on the curve so as to raise the processing speed of the addition of divisors. In the scalar multiplication processing of a fixed base point, a divisor having a weight smaller than the genus g of a curve is selected to serve as the base point to raise the processing speed.

4: Functional Configuration of the Cryptography-Processing Apparatus

FIG. 5 is a block diagram showing the functional configuration of the cryptography-processing apparatus 100 provided by the present invention. The cryptography-processing apparatus 100 is a cryptography-processing apparatus for carrying out cryptography processing computations based on the hyperelliptic curve cryptography. The cryptography-processing apparatus 100 includes a base-point generation unit 101 and a computation-processing unit 102. The base-point generation unit 101 is a unit for generating a divisor having a weight $g_0$ smaller than the genus g of a hyperelliptic curve, that is, $1 \leq g_0 < g$, to serve as a base point. On the other hand, the computation-processing unit 102 is a unit for carrying out scalar multiplication processing on divisors including the divisor generated to serve as a base point.

The base-point generation unit 101 selects $g_0$ elements over a finite field $F_q$ used as a definition body and generates $g_0$ points $P_i$ (where $i=1, \ldots, g_0$). Then, the base-point generation unit 101 determines coefficients $v_i$ of the following equation:

$$V(x) = v_{g_0-1} x^{g_0-1} + v_{g_0-2} x^{g-2} + \cdots + v_0,$$

in order to determine a divisor $D_0 = (U(x), V(x))$ to serve as a base point where $$U(x) = (x-x_1)(x-x_2) \cdots (x-x_{g_0})$$

In the case of a hyperelliptic curve having a genus g of 2, for example, the base-point generation unit 101 generates a divisor with a weight of 1 as a base point. As processing to add divisors, the computation-processing unit 102 carries out processing to add a divisor with a weight of 1 to a divisor with a weight of 2. In carrying out this processing, the computation-processing unit 102 executes an addition-processing algorithm referred to as $\text{ExHarADD}^{2+1 \to 2}$.

In addition, in the case of a hyperelliptic curve having a genus g of 3, the base-point generation unit 101 generates a divisor with a weight of 1 or 2 as a base point. As processing to add divisors, the computation-processing unit 102 carries out at least either processing to add a divisor with a weight of 1 to a divisor with a weight of 3 by execution of an addition-processing algorithm referred to as $\text{ExHarADD}^{3+1 \to 3}$ or processing to add a divisor with a weight of 2 to a divisor with a weight of 3 executes an addition-processing algorithm referred to as $\text{ExHarADD}^{3+2 \to 3}$.

It is to be noted that the computation-processing unit 102 carries out computation processing including an addition algorithm according to the Harley algorithm, and performs computations according to a scalar multiplication algorithm adopting at least the binary technique or the double-and-add-always technique. As an alternative, the computation-processing unit 102 may have a configuration for carrying out computations including an addition algorithm according to the Cantor algorithm.

In addition, as described earlier, the base-point generation unit 101 may have a configuration to generate a divisor, which is one among divisors each having a weight $g_0$ smaller than the genus g of the hyperelliptic curve where $1 \leq g_0 < g$ and represented by a Mumford expression with a polynomial including at least a coefficient of 0 or 1, to serve as a base point. By carrying out the processing to generate such a base point, the processing speed can be further increased.

5: Typical Applications of the Invention to an Algorithm for Generating and Authenticating a Digital Signature The following description explains a case in which a computation technique provided by the present invention is applied to the scalar multiplication of an ECDSA (EC-Digital Signature Algorithm), which is an algorithm for generation and authentication of a digital signature by application of the elliptic curve cryptography, by taking processing of the present invention as an example of an applicable concrete cryptography-processing algorithm. In accordance with the IEEE1363, a digital signature is generated and authenticated by execution of the following sequence.

(1): Inputs
(1-1): Input domain parameters and a base point G (order r) of an elliptic curve.
(1-2): Input a secret key s of the signatory.
(1-3): Input a plain text M.
(2): Generation of a Key
(2-1): Use W=sG as a public key for the secret key s.
(3): Generation of a Signature
(3-1): Generate a random integer u, where $0 < u < r$.
(3-2): Compute $V = uG = (x_v, y_v)$.
(3-3): Convert xv into an integer i.
(3-4): Compute c=i mod r. If c=0, go to step 3-1.
(3-5): F=h (M), where h is a hash function.
(3-6): Compute $d = u^{-1} (f+sc) \mod r$. If d=0, go to step 3-1.
(3-7): Use (c, d) as a signature for the plain text M.

(4): Authentication of a Signature (4-1): Check that relations $0<c<r$ and $0<d<r$ hold true. If they do not hold true, output "invalid".

(4-2): Compute $h=d^{-1}$ mod r, $h_1$=fh mod r and $h_2$=ch mod r.

(4-3): Compute $P=(x_p, y_p)=h_1 G+h_2 W$. If $P=0$, output "invalid".

(4-4): Convert $x_p$ into an integer i.

(4-5): Compute c'=i mod r.

(4-6): If c'=c, output "valid". Otherwise, output "invalid".

The following steps of the above algorithm are pieces of computation processing to which the proposed techniques using a hyperelliptic curve can be applied:

(2-1): Use W=sG as a public key for the secret key s;

(3-2): Compute $V=uG=(x_v, y_v)$; and (4-3): Compute $P=(x_p, y_p)=h_1 G+h_2 W$. If $P=0$, output "invalid".

The pieces of processing to compute W=sG, V=uG and $h_1 G$ of the equation $P=(x_p, y_p)=h_1 G+h_2 W$ at steps (2-1), (3-2) and (4-3) are each processing to carry out scalar multiplication on a divisor and can each be carried out at a speed increased by application of the present invention.

6: Typical Hardware Configuration of the Cryptography-Processing Apparatus

Finally, a typical configuration of an IC module 200 serving as a device for carrying out the cryptography processing described above is explained with reference to FIG. 6. The processing described above can be carried out by a variety of information-processing apparatus including a PC, an IC card and a reader/writer. The IC module 200 shown in FIG. 6 can be incorporated in these information-processing apparatus.

A CPU (Central Processing Unit) 201 employed in the information-processing apparatus shown in FIG. 6 is a processor for executing a variety of programs to start and end cryptography processing, control transmissions and receptions of data and control transfers of data among components employed in the information-processing apparatus. A memory 202 includes a ROM (Read Only Memory) and a RAM (Random Access Memory). The ROM is a memory for storing programs to be executed by the CPU 201 and constant data used as processing parameters. On the other hand, the RAM is a memory including typically a storage area and a work area. The storage area is an area for storing a program being executed by the CPU 201 to carry out processing. On the other hand, the work area is an area for storing processing parameters, which are changed in the course of execution of a program to carry out processing.

It is to be noted that a computation execution program stored in the memory 202 is a program prescribing a sequence of execution of the addition and the doubling computation, which are performed to carry out processing to set a base point and the scalar multiplication processing as described above. In addition, the memory 202 also includes an area for storing key data required in the cryptography processing. It is desirable to design the area for storing data as a memory area having a tamper-proof structure.

A cryptography-processing unit 203 is a unit for carrying out processes such as cryptography processing including the scalar multiplication described above and the decryption processing. It is to be noted that, while the cryptography-processing unit 203 is shown as an independent module, typically, a cryptography-processing program can be stored in the ROM in place of the independent cryptography-processing module. In this case, the CPU 201 reads out the cryptography-processing program from the ROM and executes the program.

A random-number generator 204 is a unit for carrying out processing to generate a random number required in, among others, generation of a key necessary for the cryptography processing.

A transmission/reception unit 205 is a data-communication-processing unit for exchanging data with an external apparatus. An example of the external apparatus is a reader/writer. In this case, data is exchanged between the reader/writer and the IC module whereas encrypted data generated in the IC module is output to the reader/writer. Data is also input from an external apparatus.

The present invention has been explained in detail so far by referring to specific embodiments. It is obvious, however, that a person skilled in the art is capable of modifying the embodiments or creating substitutes for the embodiments in a range not deviating from essentials of the present invention. That is to say, the embodiments taken as examples are only used to exemplify the present invention and are not to be interpreted as limitations to the present invention. The essentials of the present invention can only be recognized from claims appended to this specification.

It is to be noted that the series of processes described above can be carried out by hardware and/or execution of software. If the series of processes described above is carried out by execution of software, programs composing the software can be installed into a computer embedded in dedicated hardware, a general-purpose personal computer or the like from typically a program-recording medium. By installing a variety of programs into the general-purpose personal computer, the personal computer is capable of carrying out a variety of functions.

The aforementioned program-recording medium for recording the programs to be installed into a computer or a general-purpose personal computer as programs to be executed by the computer or the general-purpose personal computer respectively is a removable recording medium referred to as package media. Examples of the package media are a magnetic disk including a flexible disk, a CD-ROM (Compact Disk Read Only Memory), an MO (Magneto-Optical) disk, a DVD (Digital Versatile Disk) and the semiconductor memory. Instead of installing the programs from the package media, the programs can also be stored in advance in the storage unit 38, which is used for recording the programs temporarily or permanently. Programs recorded in the package media are referred to as the so-called package software. Instead of installing the programs from a removable recording medium, the programs can also be stored in advance in a recording medium such as a hard disk or a ROM (Read Only Memory).

It is to be noted that, instead of installing a program from a removable recording medium into a hard disk as described above, the program can also be downloaded from a download site to the computer through radio communication, or through wire communication by way of a network such as a LAN (Local Area Network) or the Internet. The computer receives the downloaded program and installs the program into a memory such as a hard disk.

It is also worth noting that various kinds of processing described in this specification can be carried out not only in a pre-prescribed order along the time axis, but also concurrently or individually in accordance with the processing power of an apparatus for carrying out the processing or in accordance with necessity. In addition, the technical term "system" used in this specification implies the configuration of a logical confluence including a plurality of apparatus, which are not necessarily accommodated in a single chassis.

What is claimed is:

1. A hyperelliptic curve cryptography method comprising:
   a base-point generation step of generating, with a cryptographic processing unit communicatively coupled to a computer recording medium, a first divisor having a weight $g_0$.smaller than a genus g of a hyperelliptic curve to serve as a base point where $1 \leq g_0 . < g$;
   a computation-processing step of performing, with said cryptographic processing unit, scalar multiplication processing of divisors including said first divisor, wherein addition processing of said scalar multiplication processing comprises adding a second divisor with a weight of g to a third divisor with a weight smaller than g; and
   a cryptographic processing step comprising at least one of signature processing, generation of encrypted data, decryption processing, processing to share a cryptography key and authentication processing.

2. The cryptography-processing method according to claim 1 wherein said base-point generation step comprises the steps of: selecting $g_0$ elements over a finite field $F_q$ used as a definition body at random and generating $g_0$ points $P_i$ (where i=1, - - - , $g_0$) on said hyperelliptic curve; and determining coefficients $v_i$ of the following equation:

$$V(x) = v_{g0-1} x^{g0-1} + v_{g0-2} x^{g0-2} + \cdots + v_0,$$

in order to determine a divisor $D_0 = (U(x), V(x))$ to serve as the base point, with $U(x)$, $V(x)$ being polynomials with $U(x)$, $V(x) \in F_q[x]$ and where $U(x) = (x-x_1)(x-x_2) \cdots (x-x_{g0})$ with $x_1, x_2, \cdots x_{g0}$ being x-coordinates of the points $P_i$, i=1, - - - , $g_0$, on said hyperelliptic curve.

3. The of claim 1 wherein, in the case of a hyperelliptic curve with a genus g of 2: said base-point generation step is a step of generating said first divisor with a weight of 1 to serve as the base point; and said computation-processing step comprises adding the third divisor having a weight of 1 to the second divisor having a weight of 2.

4. The method of claim 3 wherein said computation-processing step is a step of executing an addition-processing algorithm ExHarADD$^{2+1 \to 2}$.

5. The method of claim 1 wherein, in the case of a hyperelliptic curve with a genus g of 3: said base-point generation step is a step of generating said first divisor with a weight of 1 or 2 to serve as the base point; and said computation-processing step is a divisor addition step comprising at least one of:
   (a) adding said third divisor having a weight of 1 to said second divisor having a weight of 3; and
   (b) adding said third divisor having a weight of 2 to said second divisor having a weight of 3.

6. The method of claim 5 wherein said computation-processing step is a step of executing at least one of an addition-processing algorithm ExHarADD$^{3+2 \to 3}$ and an addition-processing algorithm ExHarADD$^{3+1 \to 3}$.

7. The method of claim 1 wherein said first divisor is one among divisors each having a weight $g_0$ smaller than said genus g of said hyperelliptic curve where $1 \leq g_0 . < g$ and has a Mumford expression with a polynomial including at least a coefficient of 0 or 1.

8. The method of claim 1 wherein said computation-processing step is a step of computation processing including an addition algorithm according to a Harley algorithm.

9. The method of claim 1 wherein said computation-processing step is a step of computation processing according to a scalar multiplication algorithm of at least one of a binary technique and a double-and-add-always technique.

10. The method of claim 1 wherein said computation-processing step is a step of computation processing including an addition algorithm according to a Cantor algorithm.

11. Information processing apparatus comprising:
    a cryptography processing unit communicatively coupled to a computer readable memory, wherein said apparatus is adapted for processing scalar multiplication in hyperelliptic cryptography, said processing comprising
    a base-point generation step of generating a first divisor having a weight $g_0$.smaller than a genus g of a hyperelliptic curve to serve as a base point where $1 \leq g_0 . < g$;
    a computation-processing step of performing scalar multiplication processing of divisors including said first divisor, wherein addition processing of said scalar multiplication processing comprises adding a second divisor with a weight of g to a third divisor with a weight smaller than g; and
    a cryptographic processing step comprising at least one of signature processing, generation of encrypted data, decryption processing, processing to share a cryptography key and authentication processing.

12. The apparatus of claim 11 wherein said base-point generation step comprises the steps of: selecting $g_0$ elements over a finite field $F_q$ used as a definition body at random and generating $g_0$ points $P_i$ (where i=1, - - - , $g_0$) on said hyperelliptic curve; and determining coefficients $v_i$ of following equation:

$$V(x) = v_{g0-1} x^{g0-1} v_{g0-2} x^{g0-2} + \cdots + v_0,$$

in order to determine a divisor $D_0 = (U(x), V(x))$ to serve as the base point, with $U(x)$, $V(x)$ being polynomials with $U(x)$, $V(x) \in F_q[x]$ and where $U(x) = (x-x_1)(x-x_2) \cdots (x-x_{g0})$ with $x_1, X_2, \cdots X_{g0}$ being x-coordinates of the points $P_i$, i=1, - - - , $g_o$, on said hyperelliptic curve.

13. The apparatus of 11 wherein, in the case of a hyperelliptic curve with a genus g of 2: said base-point generation is a step of generating said first divisor with a weight of 1 to serve as the base point; and said computation-processing unit has a configuration for adding the third divisor having a weight of 1 to the second divisor having a weight of 2.

14. The apparatus of claim 13 wherein said computation-processing step is a step of executing an addition-processing algorithm ExHarADD$^{2+1 \to 2}$.

15. The apparatus of claim 11 wherein, in the case of a hyperelliptic curve with a genus g of 3: said base-point generation step is a step of generating a divisor with a weight of 1 or 2 to serve as the base point; and said computation-processing step is a divisor addition step comprising at least one of:
    (a) adding said third divisor having a weight of 1 to said second divisor having a weight of 3; and
    (b) a step of adding said third divisor having a weight of 2 to said second divisor having a weight of 3.

16. The apparatus of claim 15 wherein said computation-processing step is a step of executing at least one of an addition-processing algorithm ExHarADD$^{3+2 \to 3}$ an addition-processing algorithm ExHarADD$^{3+1 \to 3}$.

17. The apparatus of claim 11 wherein said first divisor is one among divisors each having a weight $g_0$ smaller than said genus g of said hyperelliptic curve where $1 \leq g_0 . < g$ and has a Mumford expression with a polynomial including at least a coefficient of 0 or 1.

18. The apparatus of claim 11 wherein said computation-processing step is a step of computation processing including an addition algorithm according to a Harley algorithm.

19. The apparatus of claim 11 wherein said computation-processing step of computation processing according to a scalar multiplication algorithm of at least one of a binary technique and a double-and-add-always technique.

20. The apparatus of claim 11 wherein said computation-processing step is a step of computation processing including an addition algorithm according to a Cantor algorithm.

21. A computer program embodied on a computer recording medium for causing an information processing apparatus to process scalar multiplication in hyperelliptic cryptography by executing a base-point generation step of generating a first divisor having a weight $g_0$ smaller than genus g of a hyperelliptic curve to serve as a base point where $1 \leq g_0 . < g$;

a computation-processing step of performing scalar multiplication processing of divisors including said first divisor, wherein addition processing of said scalar multiplication processing comprises adding a second divisor with a weight of g to a third divisor with a weight smaller than g; and a cryptographic processing step comprising at least one of signature processing, generation of encrypted data, decryption processing, processes to share a cryptography key and authentication processing.

* * * * *